(12) United States Patent
Aizawa et al.

(10) Patent No.: US 10,137,370 B2
(45) Date of Patent: Nov. 27, 2018

(54) INFORMATION PROCESSING DEVICE, INFORMATION PROCESSING SYSTEM, CORRECTION METHOD, CONTROL METHOD, CORRECTION PROGRAM, CONTROL PROGRAM AND RECORDING MEDIUM

(71) Applicant: SONY INTERACTIVE ENTERTAINMENT INC., Tokyo (JP)

(72) Inventors: Shinji Aizawa, Tokyo (JP); Shizuto Fukuda, Tokyo (JP); Hisao Wada, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 50 days.

(21) Appl. No.: 15/119,768

(22) PCT Filed: Feb. 20, 2015

(86) PCT No.: PCT/JP2015/054711
§ 371 (c)(1),
(2) Date: Aug. 18, 2016

(87) PCT Pub. No.: WO2015/129558
PCT Pub. Date: Sep. 3, 2015

(65) Prior Publication Data
US 2017/0056768 A1 Mar. 2, 2017

(30) Foreign Application Priority Data

Feb. 28, 2014 (JP) .................................. 2014-039864
Feb. 28, 2014 (JP) .................................. 2014-039865

(51) Int. Cl.
*A63F 13/42* (2014.01)
*G06F 3/01* (2006.01)
(Continued)

(52) U.S. Cl.
CPC .............. *A63F 13/42* (2014.09); *A63F 13/22* (2014.09); *A63F 13/24* (2014.09); *A63F 13/25* (2014.09);
(Continued)

(58) Field of Classification Search
CPC .......... G06K 9/00664–9/00704; G06F 3/0481; G06F 3/04817; G06F 9/4443;
(Continued)

(56) References Cited

U.S. PATENT DOCUMENTS

2009/0131171 A1 5/2009 Miyazaki
2010/0265249 A1* 10/2010 Sato ........................ A63F 13/06
345/419
(Continued)

FOREIGN PATENT DOCUMENTS

JP 10-253361 A 9/1998
JP 2001-340641 A 12/2001
(Continued)

OTHER PUBLICATIONS

International Preliminary Report on Patentability dated Sep. 15, 2016, from the corresponding PCT/JP2015/054711.
(Continued)

*Primary Examiner* — Todd Buttram
(74) *Attorney, Agent, or Firm* — Katten Muchin Rosenman LLP

(57) ABSTRACT

An information processing device includes an operation acquisition unit (361) configured to acquire an input value in accordance with an inputting operation from an operation apparatus, an operation correction unit (369) configured to correct a rotation angle corresponding to the acquired input value on the basis of a correction value retained in advance, and a processing unit (application execution unit (36B)) configured to rotate a point of view of rendering in a virtual (Continued)

space in accordance with the corrected rotation angle. Consequently, the rotation angle of the point of view can be corrected to a rotation angle favorable to a user.

5 Claims, 35 Drawing Sheets

(51) Int. Cl.
*A63F 13/22* (2014.01)
*A63F 13/24* (2014.01)
*A63F 13/25* (2014.01)
*G06F 3/0338* (2013.01)
*A63F 13/335* (2014.01)
*A63F 13/79* (2014.01)
*G06F 3/038* (2013.01)
*G06F 3/0481* (2013.01)
*G06F 3/0354* (2013.01)
*G06F 3/02* (2006.01)
*G06F 3/0482* (2013.01)
*G06F 3/0489* (2013.01)

(52) U.S. Cl.
CPC ............ *A63F 13/335* (2014.09); *A63F 13/79* (2014.09); *G06F 3/011* (2013.01); *G06F 3/038* (2013.01); *G06F 3/0338* (2013.01); *G06F 3/03547* (2013.01); *G06F 3/04815* (2013.01); *G06F 3/02* (2013.01); *G06F 3/03543* (2013.01); *G06F 3/0482* (2013.01); *G06F 3/0489* (2013.01); *G06F 3/04817* (2013.01)

(58) Field of Classification Search
CPC .. G06F 3/04847; G06F 11/3664; G06F 3/011; G06F 3/012; G06F 3/0304; G06T 19/00; G06T 17/00; G06T 19/006; G06T 2215/16; H04N 5/272; H04N 2201/3245; A63F 13/10
See application file for complete search history.

(56) References Cited

U.S. PATENT DOCUMENTS

2012/0188694 A1 7/2012 Sakakibara et al.
2012/0229454 A1 9/2012 Hayashi et al.
2015/0019152 A1* 1/2015 Scheibenzuber .... G01D 5/2448
702/94

FOREIGN PATENT DOCUMENTS

JP 2012-252468 A 12/2012
JP 2012252468 A * 12/2012

OTHER PUBLICATIONS

International Search Report and Written Opinion dated May 12, 2015, from the corresponding PCT/JP2015/054711.
Natsuki Ogawa, Pasokon no Urawaza & Benriwaza (Tips20 Keyboard Hairetsu o Henko suru), PCfan, vol. 18, No. 1, Nov. 30, 2010 (Nov. 30, 2010) (received date), p. 66.

* cited by examiner

INPUT AN OPERATION TO BE ALLOCATED

FIG. 30

| TITLE | | RELEASE DATE | EVALUATION | TYPE | PRICE |
|---|---|---|---|---|---|
| Title1<br>FREE PLAY, RACE, SIMULATION, SPORTS | | XXXX YEAR<br>XX MONTH XX DATE | | CN2 | |
| Title2<br>FREE PLAY | | XXXX YEAR<br>XX MONTH XX DATE | | CN1 | |
| Title3<br>RACE | | XXXX YEAR<br>XX MONTH XX DATE | 83 | CN2 | |
| Title4<br>RACE | | XXXX YEAR<br>XX MONTH XX DATE | CN1 62 | CN2 | |
| Title5<br>RACE | | XXXX YEAR<br>XX MONTH XX DATE | 72 | CN2 | |
| Title6<br>ADVENTURE | | XXXX YEAR<br>XX MONTH XX DATE | 76 | CN2 | |
| Title7<br>RACE | | XXXX YEAR<br>XX MONTH XX DATE | CN1 | CN2 | |
| Title8<br>RACE | | XXXX YEAR<br>XX MONTH XX DATE | CN1 | CN2 | | race:GAME   page:1 | 2 | 3 ) 10 >>

FIG. 32

| race:GAME | | | | | | LS12 |
|---|---|---|---|---|---|---|
| | | | | page:1 2 3 ... 10 >> | | |
| TITLE | | RELEASE DATE | EVALUATION | TYPE | PRICE | |
| | Title1<br>FREE PLAY, RACE, SIMULATION, SPORTS | XXXX YEAR<br>XX MONTH XX DATE | | 🖱 | CN2 | |
| | Title2<br>FREE PLAY | XXXX YEAR<br>XX MONTH XX DATE | | 🎮 | CN1 | |
| | Title3<br>RACE | XXXX YEAR<br>XX MONTH XX DATE | 83 | 🖱 | CN2 | |
| | Title4<br>RACE | XXXX YEAR<br>XX MONTH XX DATE | CN1<br>62 | 🎮 | CN2 | |
| | Title5<br>RACE | XXXX YEAR<br>XX MONTH XX DATE | 72 | 👟 | CN6 | |
| | Title6<br>ADVENTURE | XXXX YEAR<br>XX MONTH XX DATE | 76 | 🖱 | CN2 | |
| | Title7<br>RACE | XXXX YEAR<br>XX MONTH XX DATE | CN1 | 🎮 | CN2 | |
| | Title8<br>RACE | XXXX YEAR<br>XX MONTH XX DATE | CN6 | 👟 | CN2 | |

FIG. 33

| sport | | | | | | LS12 |
|---|---|---|---|---|---|---|
| | | | | | | LS(LS4) | page:1 | 2 | 3 ... 10 >>  ← LS43

| TITLE (CL1) | RELEASE DATE (CL2) | EVALUATION (CL3) | TYPE (CL4) | PRICE (CL5) |
|---|---|---|---|---|
| Sport1<br>SIMULATION, SPORTS | XXXX YEAR<br>XX MONTH XX DATE | 86 | 🎮 | CN1 |
| Sport2<br>ACTION | XXXX YEAR<br>XX MONTH XX DATE | CN1 | 🎮 | CN8 |
| Sport3<br>CASUAL, INDEPENDENT DEVELOPMENT COMPANY, SPORTS, STRATEGY | XXXX YEAR<br>XX MONTH XX DATE | | 🎮 | CN6 |
| Sport4<br>SPORTS | XXXX YEAR<br>XX MONTH XX DATE | CN1<br>86 | 🎮 | CN7 |
| Sport5<br>RACE, SPORTS | XXXX YEAR<br>XX MONTH XX DATE | | 🎮 | CN6 |
| Sport6 | XXXX YEAR<br>XX MONTH XX DATE | CN1 | 🎮 | CN8 |
| Sport7<br>SPORTS | XXXX YEAR<br>XX MONTH XX DATE | 85 | 🎮 | CN1 |

TR, LS11, R

FIG. 35 race:GAME

| TITLE | RELEASE DATE | EVALUATION | TYPE | PRICE |
|---|---|---|---|---|
| | | | page:1 2 3 ... 10 >> | |
| Title1<br>FREE PLAY, RACE, SIMULATION, SPORTS RELEASE DATE: XXXX YEAR XX MONTH XX DATE | XXXX YEAR<br>XX MONTH XX DATE | | | CN2 |
| Title2<br>FREE PLAY, RELEASE DATE, TBA | | | | CN1 |
| Title3<br>RACE - RELEASE DATE: XXXX YEAR XX MONTH XX DATE | XXXX YEAR<br>XX MONTH XX DATE | CN2 83 | CN2 | CN9 |
| Title4<br>RACE - RELEASE DATE: XXXX YEAR XX MONTH XX DATE | XXXX YEAR<br>XX MONTH XX DATE | CN1 62 | CN1 | CN9 |
| Title5<br>RACE - RELEASE DATE: XXXX YEAR XX MONTH XX DATE | XXXX YEAR<br>XX MONTH XX DATE | 72 | | |
| Title6<br>ADVENTURE - RELEASE DATE: XXXX YEAR XX MONTH XX DATE | XXXX YEAR<br>XX MONTH XX DATE | 76 | | |
| Title7<br>RACE - RELEASE DATE: XXXX YEAR XX MONTH XX DATE | XXXX YEAR<br>XX MONTH XX DATE | | CN1 | CN2 |
| Title8<br>RACE - RELEASE DATE: XXXX YEAR XX MONTH XX DATE | XXXX YEAR<br>XX MONTH XX DATE | | CN1 | CN9 |

INFORMATION PROCESSING DEVICE, INFORMATION PROCESSING SYSTEM, CORRECTION METHOD, CONTROL METHOD, CORRECTION PROGRAM, CONTROL PROGRAM AND RECORDING MEDIUM

TECHNICAL FIELD

The present invention relates to an information processing device, an information processing system, a correction method, a control method, a correction program, a control program and a recording medium.

BACKGROUND ART

In related art, a game system is known which includes a game apparatus, a controller for operating the game apparatus and a display apparatus (for example, refer to PTL 1).

In the game system disclosed in PTL 1, an operation signal in accordance with an operation of a player is transmitted from the controller to the game apparatus, and the game apparatus executes a game program in accordance with the received operation signal to advance the game. Further, the game apparatus transmits a game screen image indicative of a progress situation of the game being advanced to the display apparatus such that the game screen image is displayed on the display apparatus.

It is to be noted that the controller has operation devices called analog stick at left and right positions thereof. The analog sticks have a joystick structure having two axes orthogonal to each other and have an operation member provided for tilting motion with respect to a housing of the controller. The controller outputs an operation signal including a coordinate value of the operation member in accordance with a direction of the tilting operation.

Meanwhile, some game apparatuses in recent years are configured such that not only a controller having direction keys, operation buttons and so forth disclosed in PTL 1 described hereinabove, but also a pointing device such as a so-called mouse can be connected thereto. Also it is possible for the game apparatus to advance a game in response to an operation signal received from the pointing device connected thereto.

Further, in the game system disclosed in PTL 1, a direction key which allows upward, downward, leftward and rightward inputs and a plurality of buttons are disposed on the controller, and an operation signal in accordance with an input of any of the key and buttons is outputted. Further, the game apparatus is a so-called installation type game apparatus and advances, if the operation signal is received from the controller, a game in accordance with the received operation signal.

Further, a portable terminal is known wherein a controller and a display apparatus are integrated with each other and a processing apparatus provided in a housing advances a game in accordance with an operation signal inputted from the controller (for example, refer to PTL 2).

Incidentally, in a game executed in an information processing device such as the game apparatus or a portable terminal described above, a key assignment is set in advance. The key assignment is to assign a function to each key or each button, and, for example, if the controller outputs an operation signal in response to an input of a certain button, then the game apparatus specifies the inputted button on the basis of the operation signal and thereby recognizes that the button is inputted.

CITATION LIST

Patent Literatures

[PTL 1]
U.S. Patent Application Publication No. 2009/0131171
[PTL 2]
U.S. Patent Application Publication No. 2012/0188694

SUMMARY

Technical Problems

Incidentally, when a player of a game operates an operation device such as the controller and the mouse described above to move a player character, if the player character does not move by a movement amount desired by the player, then the player of the game is likely to realize hardness in operation. For example, even if the player operates the analog stick and the mouse by an input amount desired by the player such that the point of view of the player character disposed in a virtual three-dimensional space goes round, the rotational processing amount (operation amount) of the point of view is sometimes smaller than one round or sometimes exceeds one round. In such a case, it is necessary for the player to change the inputting operation of the operation device from the input amount desired by the player in accordance with settings of the game or the system and then play the game, and there is a problem that it is hard to perform an operation.

Further, the key assignment is frequently different from the liking of the user (namely, the player of the game). In such a case, it is necessary for the user to operate in accordance with the key assignment set to the game.

Further, depending upon the use situation of the controller or the portable terminal, such a situation that the controller and the portable terminal can be operated but with only one hand possibly occurs. Such a situation as just described is not supposed frequently in a general game, and even in a game configured for selection from a plurality of different key assignments, an operation for advancing the game may not be performed.

Therefore, a configuration for making it possible to perform an operation of an information processing device by an operation device is demanded.

It is one of objects of the present invention to provide an information processing device, an information processing system, a correction method, a correction program, and a recording medium by which a point of view can be corrected to a rotation angle desired by a user.

It is another one of objects of the present invention to provide an information processing device, an information processing system, a control method, a control program and a recording medium which facilitate an operation by an operation device.

Solution to Problems

According to a first aspect of the present invention, there is provided an information processing device including an operation acquisition unit configured to acquire an input value in accordance with an inputting operation from an operation apparatus, an operation correction unit configured to correct a rotation angle corresponding to the acquired input value on the basis of a correction value retained in advance, and a processing unit configured to rotate a point of view of rendering in a virtual space in accordance with the corrected rotation angle.

With the first aspect described above, the rotation angle in accordance with an input value acquired from the operation apparatus in response to an inputting operation (rotation angle of the point of view) is corrected on the basis of the correction value retained in advance. Then, the point of view of rendering in the virtual space is rotated in accordance with the corrected rotation angle.

With the first aspect described above, by using, as the correction value, the correction value which corrects the rotation angle in accordance with the acquired input value so as to become a rotation angle favorable to a user, the point of view can be rotated by the angle favorable to the user by an input amount favorable to the user to the operation apparatus. Accordingly, the rotation angle of the point of view can be corrected to a rotation angle favorable to the user, and the inputting operation for rotating the point of view can be facilitated.

In the first aspect described above, preferably the information processing device is configured such that the information processing device further includes a correction value calculation unit configured to calculate the correction value on the basis of an input amount which is an integration value of the input value acquired when an inputting operation for rotating the point of view by a given angle is performed and a reference amount set in advance as an input amount for rotating the point of view by the given angle, and the operation correction unit corrects a rotation angle corresponding to the input value acquired by the operation acquisition unit on the basis of the calculated correction value.

With the first aspect described above, the correction value is calculated on the basis of a rotation amount in accordance with an inputting operation performed by the user for rotating the point of view by the given angle and the reference amount set in advance as a rotation amount for rotating the point of view by the given angle. For example, where the given angle is 360 degrees which are a rotation angle for one round, the correction value is calculated on the basis of an input amount acquired by the user actually performing an inputting operation for causing the point of view to go round and the reference amount set in advance as the input amount for causing the point of view to go round. With the calculation described, since the correction value is calculated on the basis of an actual inputting operation of the user, the rotation angle in accordance with an input value acquired in accordance with the inputting operation can be corrected with certain to a rotation angle favorable to the user. Accordingly, it is possible for the user to carry out the inputting operation easily.

In the first aspect described above, preferably the information processing device is configured such that the operation apparatus detects an acceleration value upon an inputting operation, that the operation acquisition unit acquires the acceleration value as the input value, and that the correction value calculation unit acquires an integration value of a speed based on the acceleration value acquired within a time period of an inputting operation within which the point of view is rotated by the given angle as the input amount when the inputting operation for rotating the point of view by the given angle is performed.

It is to be noted that, as the operation apparatus described above, a pointing device such as a mouse or a motion sensor which detects an acceleration value acting upon the operation apparatus upon a moving operation of the operation apparatus itself can be exemplified. Further, a pointing device such as a track ball which detects an acceleration value acting upon some component of the pointing device upon an inputting operation for the component can be exemplified.

In such operation apparatus, the acceleration value detected and the speed calculated from the acceleration value differ much among different users who use the operation apparatus. Therefore, even if it is tried to correct a rotation angle corresponding to the input value using a correction value set in advance, it is difficult to correct the rotation angle to a rotation angle in accordance with a liking of the user.

In contrast, with the first aspect described above, since the correction value is calculated in accordance with an actual inputting operation of the user, the rotation angle can be corrected with certainty to a rotation angle in accordance with an input value favorable to the user without depending upon the used operation apparatus.

In the first aspect described above, preferably the information processing device is configured such that the operation apparatus has an operation element provided for tilting motion and detects a coordinate value indicating a position of the operation element after the tilting motion, that the operation acquisition unit acquires the coordinate value detected by the operation apparatus as the input value, that the correction value calculation unit determines, as the input value when an inputting operation for rotating the point of view by the given angle is performed, an integration value of a rotation angle corresponding to the coordinate value within a time period within which the coordinate value indicating a position of the operation element after the tilting motion is acquired and calculates the correction value on the basis of the input amount and the reference amount, and that the operation correction unit corrects a rotation angle in accordance with the coordinate value acquired from the operation apparatus on the basis of the correction value.

It is to be noted that, as the operation apparatus described above, a controller which includes the analog stick and the pointing stick described above and a joystick can be exemplified.

With the first aspect described above, the correction value calculation unit acquires, as the input amount, an integration value of the rotation angle in accordance with the coordinate value acquired when an inputting operation for rotating the point of view by the given angle is performed, and calculates the correction value on the basis of the input amount and the given angle as the reference amount. For example, for example, when the given angle is 360 degrees which are a rotation angle for one round, the correction value calculation unit calculates the correction value on the basis of the integration value of the rotation angle in accordance with an inputting operation actually performed by the user as an inputting operation for one round and 360 degrees of the rotation angle for one round. Then, the operation correction unit corrects the rotation angle in accordance with the coordinate value acquired from the operation device on the basis of the correction value. With the correction described, since the rotation angle in accordance with the coordinate value is corrected, the rotation angle can be corrected with certainty to a rotation angle in accordance with an input value favorable to the user.

In the first aspect described above, preferably the information processing device is configured such that the information processing device further includes a correction value acquisition unit configured to acquire the correction value from an external apparatus, and that the operation correction unit uses the correction value acquired by the correction value acquisition unit.

It is to be noted that, as the external apparatus, an external storage connected directly or indirectly to the information processing device can be exemplified. Further, a server connected for communication by wire communication or wireless communication to the information processing device can be exemplified.

With the first aspect described above, since the correction value can be acquired from the external apparatus, when a new information processing device or a different information processing device is used, when a correction value stored in the information processing device is deleted (including a case in which the operating system, abbreviated as OS, is re-installed into the information processing device) or in a like case, the correction process of the rotation angle can be executed using the acquired correction value without repetitively executing the calculation process of the correction value again.

According to a second aspect of the present invention, there is provided an information processing system, including the information processing device, and an operation apparatus configured to transmit an input value in accordance with an inputting operation to the information processing device.

With the second aspect described above, similar effects to those of the information processing device according to the first aspect can be anticipated.

According to a third aspect of the present invention, there is provided an information processing device, including an operation acquisition unit configured to acquire operation information in accordance with an inputting operation from an operation apparatus, an operation conversion unit configured to convert pre-conversion operation information which is operation information in accordance with a pre-conversion operation which is the inputting operation into post-conversion operation information which is operation information in accordance with post-conversion operation different from the pre-conversion operation, an execution unit configured to execute a given process on the basis of the post-conversion operation information, and a display controlling unit configured to cause a screen image indicating at least the post-conversion operation to be displayed.

It is to be noted that, as the operation apparatus, a control pad (controller) and a pointing device such as a mouse can be exemplified, and as the inputting operation for the operation apparatus, an inputting operation for a button or the like and a tilting operation of a stick or the like provided on the pointing device can be exemplified.

With the third aspect described above, when the given inputting operation is performed for the operation apparatus, a process in accordance with an inputting operation (post-conversion operation) different from the given inputting operation (pre-conversion operation) can be executed. For example, when the controller is operated with one hand, an inputting operation which can be carried out only with the other hand can be carried out with the one hand. Accordingly, the operation of the information processing device by the operation apparatus can be carried out readily.

Further, since the post-conversion operation is displayed on a screen image by the display controlling unit, if the user confirms the screen image, then the user can recognize into what inputting operation (post-conversion operation) an inputting operation actually performed (pre-conversion operation) has been converted. Accordingly, an operation of the information processing device by the operation apparatus can be carried out more readily.

In the third aspect described above, preferably the information processing device is configured such that the screen image includes a pre-conversion operation displaying region in which a pattern simulating the operation apparatus is set and which indicates the pre-conversion operation, a post-conversion operation displaying region which indicates the post-conversion operation, and an execution screen displaying region in which an execution screen image of the process by the execution unit is displayed.

With the third aspect described above, the screen image includes, in addition to the pre-conversion operation displaying region and the post-conversion operation displaying region in which a pre-conversion operation and a post-conversion operation are indicated, respectively, the execution screen image displaying region. With this, in addition to contents of the pre-conversion operation and the post-conversion operation, also an execution screen image of a process to be executed in response to the post-conversion operation can be observed. Accordingly, while contents of the pre-conversion operation and the post-conversion operation are confirmed, also the execution screen image of the process can be observed. Consequently, the information processing device can be operated more readily by the operation apparatus.

In the third aspect described above, preferably the information processing device is configured such that the pre-conversion operation displaying region and the post-conversion operation displaying region are a same displaying region and the pre-conversion operation and the post-conversion operation are indicated in the displaying region.

Here, the user of the information processing device which executes such a conversion process of an inputting operation as described above tends to emphasize, as the user becomes more familiar with an operation by the operation apparatus, the execution screen image of a process executed as a result of an inputting operation rather than contents of the pre-conversion operation and the post-conversion operation.

Besides, with the third aspect, a pre-conversion operation and a post-conversion operation are indicated in the single displaying region. Therefore, it is possible to decrease the ratio of the area occupied by the display region which indicates the operations in the display screen image. Accordingly, since the ratio of the area occupied by the execution screen image displaying region in the screen image can be increased, it is possible to facilitate recognition of a situation and a result of a process obtained as a result of an inputting operation for the operation apparatus.

In the third aspect described above, preferably the information processing device is configured such that the information processing device further includes a conversion information generation unit configured to generate conversion information for converting the pre-conversion operation information into the post-conversion operation information, that the display controlling unit controls such that a pre-conversion operation registration screen image for which the pre-conversion operation is to be performed and a post-conversion operation registration screen image for which the post-conversion operation to be performed are displayed, that the conversion information generation unit generates the conversion information on the basis of the pre-conversion operation information acquired upon displaying of the pre-conversion operation registration screen image and the post-conversion operation information acquired upon displaying of the post-conversion operation registration screen image, and that the operation conversion unit converts the pre-conversion operation information into the post-conversion operation information on the basis of the conversion information.

With the third aspect described above, the pre-conversion operation information is acquired in accordance with an inputting operation when the pre-conversion operation registration screen image is displayed, and the post-conversion operation information is acquired in accordance with an inputting operation when the post-conversion operation registration screen image is displayed. In other words, the pre-conversion operation and the post-conversion operation are carried out actually by the user using the operation apparatus. With this, since conversion information based on the operation information actually acquired when the pre-conversion operation and the post-conversion operation are performed is generated by the conversion information generation unit, the pre-conversion operation information can be converted into the post-conversion operation information with certainty and appropriately by the operation conversion unit.

Further, since the pre-conversion operation and the post-conversion operation are actually performed to generate the conversion information in this manner and an inputting operation is converted in accordance with the generated conversion information, contents of a process to be executed in accordance with an inputting operation for the operation apparatus (in other words, an operation method of the information processing device using the operation apparatus) can be customized in accordance with a liking of the user. Accordingly, it is possible to further facilitate operation of the information processing device by the operation apparatus.

In the third aspect described above, preferably the information processing device is configured such that the information processing device further includes a communication unit configured to communicate with an external apparatus which retains conversion information for converting the pre-conversion operation information into the post-conversion operation information, and that the operation conversion unit converts the pre-conversion operation information into the post-conversion operation information on the basis of the conversion information acquired from the external apparatus.

It is to be noted that, as the external apparatus, an external storage connected directly or indirectly to the information processing device can be exemplified. Further, a server connected for communication by wire communication or wireless communication to the information processing device can be exemplified.

With the third aspect described above, since the conversion information can be acquired from the external apparatus, in a case in which a new information processing device or a different information processing device is used, in another case in which conversion information retained in the information processing device is deleted (including a case in which the OS is re-installed into the information processing device) or in a like case, the conversion process by the operation conversion unit can be executed using the acquired conversion information without repetitively executing the generation process of the conversion information again.

In the third aspect described above, preferably the information processing device is configured such that the information processing device further includes a main control unit configured to execute a control program for controlling the information processing device to control the information processing device, and an application execution unit configured to execute a given application under the control of the main control unit, that the main control unit includes the operation acquisition unit, operation conversion unit and display controlling unit, and that the application execution unit includes the execution unit.

It is to be noted that, as the control program, an OS can be exemplified, and as the application, various applications such as a game application can be exemplified.

With the third aspect described above, since the main controlling unit which executes the control program includes the operation acquisition unit, operation conversion unit and display controlling unit, the conversion process of an inputting operation is performed by the main controlling unit. Then, the application execution unit acquires a processing result by the main controlling unit and executes a given application. With this, there is no necessity to incorporate a program for executing the conversion process into each application. Accordingly, the development step of an application can be simplified.

According to a fourth aspect of the present invention, there is provided an information processing device for displaying a list screen image in which application information indicating applications is set, wherein the list screen image is displayed in which, from within the application information, information of an application by which a connectable operation apparatus which is at least one of an operation apparatus connected to the information processing device and another operation apparatus registered in advance in the information processing device can be utilized and information of an application by which the connectable operation apparatus cannot be utilized can be identified.

In recent years, game apparatus and portable terminals which can communicate with a server through a network have become popular, and such game apparatus and portable terminals can download and execute an application from the server. Thereupon, a user generally selects a desired application from within a list screen image provided from the server and displayed and downloads the desired application. However, there is a problem that whether or not an operation apparatus such as a controller owned by the user can be utilized in the desired application cannot be decided until the desired application is downloaded and executed.

In contrast, with the fourth aspect described above, a list screen image is displayed in which information of applications which can utilize the connectable operation apparatus which is at least one of the operation apparatus connected to the information processing device and another operation apparatus registered in advance in the information processing device and information of applications which cannot utilize the connectable operation apparatus can be identified. With this, applications which can utilize the operation apparatus owned by the user can be identified. Accordingly, a utilizable application can be recognized readily.

In the fourth aspect described above, preferably the information processing device is configured such that information of an application by which an operation apparatus connected to the information processing device can be utilized and information of an application by which an operation apparatus registered in advance in the information processing device can be utilized are displayed distinctly in the list screen image, and that the list screen image for which one of filtering of one of information of an application by which the connected operation apparatus can be utilized and information of an application by which the operation apparatus registered in advance can be utilized and sorting of both pieces of information is performed is displayed in accordance with a given inputting operation for the connected operation apparatus.

It is to be noted that the term filtering signifies a process of extracting only one of the information of the applications which can utilize the operation apparatus connected to the information processing device and the information of the applications which can utilize the operation apparatus registered in advance in the information processing device. Further, the term sorting signifies a process of distinguishing the information of the former applications and the information of the latter applications from each other.

With the fourth aspect described above, since the list screen image for which any of the filtering and the sorting is carried out by a given inputting operation for the operation apparatus is displayed, applications which can be operated by the operation apparatus owned by the user can be identified readily.

According to a fifth aspect of the present invention, there is provided an information processing system, including the information processing device described above, and an operation apparatus configured to transmit operation information in accordance with an inputting operation to the information processing device.

With the fifth aspect described above, similar effects to those of the information processing device according to the third aspect can be anticipated.

According to a sixth aspect of the present invention, there is provided a correction method which is performed using an information processing device which executes a rendering process of a virtual space and corrects a rotation angle of a point of view in accordance with an inputting operation for an operation apparatus, the correction method including an acquisition step of acquiring an input value in accordance with an inputting operation from the operation apparatus, a correction step of correcting a rotation angle corresponding to the acquired input value on the basis of a correction value retained in advance, and a point-of-view rotation step of rotating the point of view in response to the corrected rotation angle.

With the sixth aspect described above, where the correction method described above is executed by the information processing device, similar effects to those of the information processing device according to the first aspect can be anticipated.

According to a seventh aspect of the present invention, there is provided a control method which is performed using an information processing device which acquires operation information in accordance with an inputting operation from an operation apparatus and causes the information processing device to execute a given process, the control method including an operation acquisition step of acquiring pre-conversion operation information which is operation information in accordance with a pre-conversion operation which is the inputting operation, an operation conversion step of converting the pre-conversion operation information into post-conversion operation information which is operation information in accordance with a post-conversion operation different from the pre-conversion operation, an execution step of executing a process in accordance with the post-conversion operation information, and a display controlling step of displaying a screen image indicating at least the post-conversion operation. With the seventh aspect described above, where the control method described above is executed by the information processing device, similar effects to those of the information processing device according to the third aspect can be anticipated.

According to an eighth aspect of the present invention, there is provided a correction program executed by an information processing device which executes a rendering process of a virtual space for correcting a rotation angle of a point of view in accordance with an inputting operation for an operation apparatus, the program causing the information processing device to execute an acquisition step of acquiring an input value corresponding to an inputting operation from the operation apparatus, a correction step of correcting a rotation angle in accordance with the acquired input value on the basis of a correction value retained in advance, and a point-of-view rotation step of rotating the point of view in accordance with the corrected rotation angle. With the eighth aspect described above, where the correction program described above is executed by the information processing device, similar effects to those of the information processing device according to the first aspect can be anticipated.

According to a ninth aspect of the present invention, there is provided a recording medium on which the correction program is recorded for computer-reading.

With the ninth aspect described above, where the information processing device reads the correction program recorded on the recording medium and executes the correction program, similar effects to those of the information processing device according to the first aspect can be anticipated. Further, as the recording medium, a magnetic tape, a disk type recording medium, an HDD (Hard Disk Drive), a semiconductor memory and so forth can be used, and they can be utilized to install and execute the correction program described above and can carry out distribution of the correction program.

According to a tenth aspect of the present invention, there is provided a control program executed by an information processing device which acquires operation information in accordance with an inputting operation from an operation apparatus for causing the information processing device to execute a given process, the control program causing the information processing device to execute an operation acquisition step of acquiring pre-conversion operation information which is operation information in accordance with a pre-conversion operation which is the inputting operation, an operation conversion step of converting the pre-conversion operation information into post-conversion operation information which is operation information in accordance with a post-conversion operation different from the pre-conversion operation, an execution step of executing a process in accordance with the post-conversion operation information, and a display controlling step of displaying a screen image at least indicating the post-conversion operation.

With the tenth aspect described above, where the control program is executed by the information processing device, similar effects to those of the information processing device according to the third aspect can be anticipated.

According to an eleventh aspect of the present invention, there is provided a recording medium on which the control program is recorded for computer-reading.

With the eleventh aspect described above, where the information processing device reads the control program recorded on the recording medium and executes the control program, similar effects to those of the information processing device according to the third aspect can be anticipated. Further, as the recording medium, a magnetic tape, a disk type recording medium, an HDD, a semiconductor memory and so forth can be used, and they can be utilized to install and execute the control program described above and can carry out distribution of the control program.

BRIEF DESCRIPTION OF DRAWINGS

FIG. 30 is a view depicting an example of a list screen image in which a plurality of icons are set in the embodiment.

FIG. 32 is a view depicting another different example of the list screen image in the embodiment.

FIG. 33 is a view depicting a further different example of the list screen image in the embodiment.

FIG. 35 is a view depicting a still further different example of the list screen image in the embodiment.

DESCRIPTION OF EMBODIMENTS

First Embodiment

In the following, a first embodiment of the present invention is described with reference to the drawings.

Figure 1:
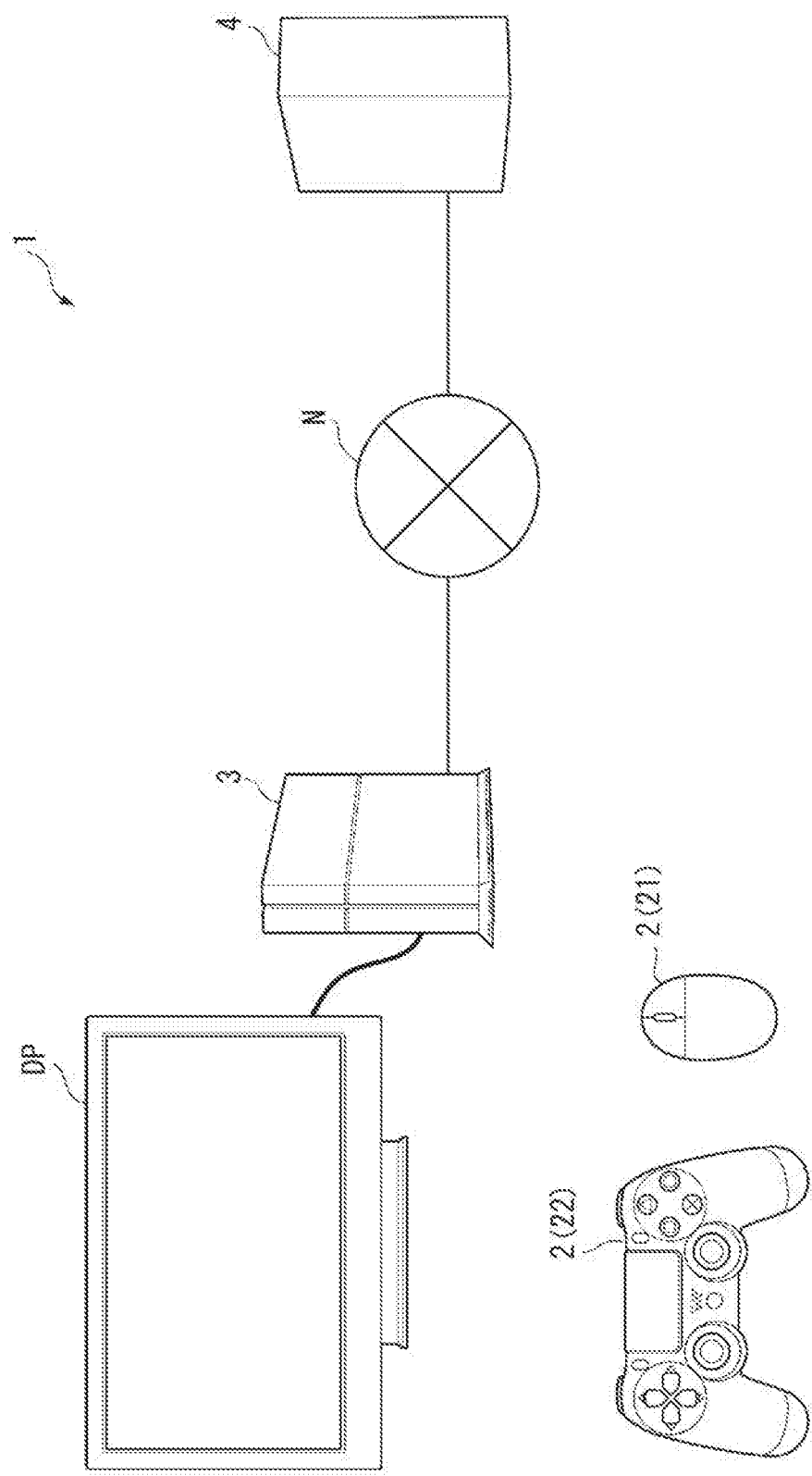
FIG. 1 is a schematic view depicting a configuration of an information processing system according to a first embodiment.

FIG. 1 is a schematic view depicting an example of an information processing system 1 according to the present embodiment.

[Configuration of Information Processing System]

The information processing system 1 according to the present embodiment includes, as depicted in FIG. 1, an operation apparatus 2, an information processing device 3 which executes a predetermined process in response to an operation signal received from any of the operation apparatuses 2, and a display apparatus DP which displays an image received from the information processing device 3.

In the information processing system 1 according to the present embodiment, the information processing device 3 executes a predetermined application (for example, a game application) in accordance with an operation signal received from any of the operation apparatuses 2. Further, the information processing device 3 corrects an input value of any of the operation apparatuses 2 using a correction value calculated in accordance with an inputting operation of a user to the operation apparatus 2 to adjust the sensitivity of a mouse 21 and a controller 22, namely, a processing amount of a predetermined process executed in accordance with an inputting operation of the operation apparatus. Further, the information processing device 3 is configured such that it registers and acquires a calculated correction value to make it possible, even when the predetermined application described above is executed by a different information processing device 3, to perform adjustment to the same sensitivity.

In the following, the components of the information processing system 1 are described.

[Configuration of Mouse]

The operation apparatus 2 in the present embodiment includes a mouse 21 and a controller 22. The mouse 21 and the controller 22 transmit an operation signal in accordance with an operation thereof by a user to the information processing device 3 by wired transmission or wireless transmission.

Out of the mouse 21 and the controller 22, the mouse 21 is a pointing device generally used as an operation apparatus of a computer. The mouse 21 has a plurality of buttons (for example, left and right buttons) and transmits an operation signal indicative of a type of an inputted button. Further, the mouse 21 has a sensor (not depicted) for detecting an acceleration, detects an acceleration value involved in a moving operation of the mouse 21 at a predetermined sampling rate and transmits the detected acceleration value and a direction of action of the acceleration value as input values to the mouse 21.

[Configuration of Controller]

Figure 2:
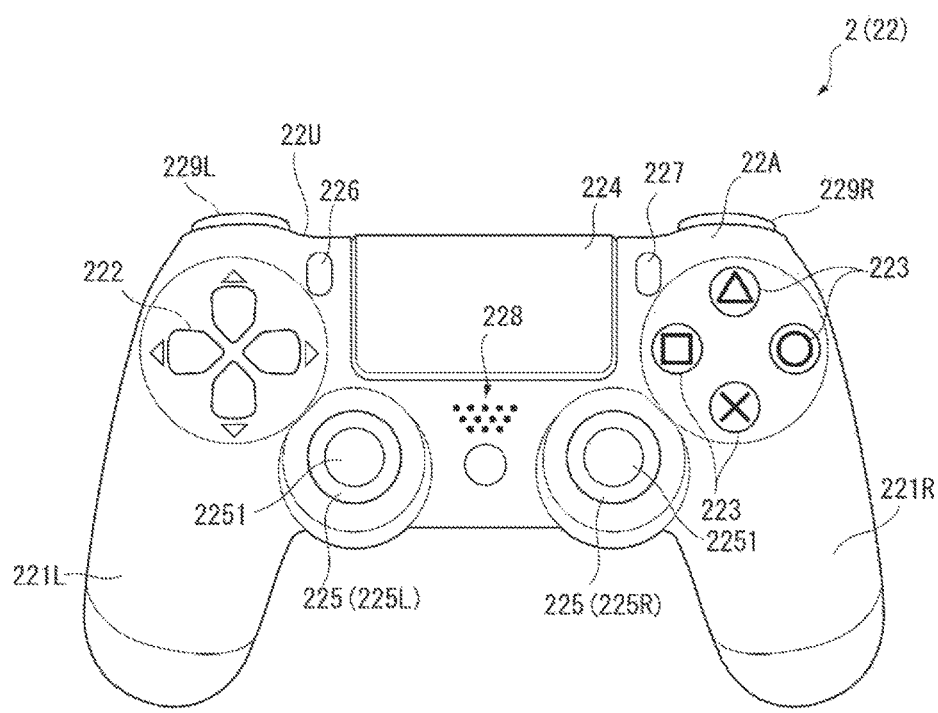
FIG. 2 is a front elevational view depicting a controller in the first embodiment.

FIG. 2 is a front elevational view depicting the controller 22.

As depicted in FIG. 2, the controller 22 is a control pad configured in an inverted U shape as viewed from the front side and is a kind of pointing device. The controller 22 has grip portions 221L and 221R provided at a left side end portion and a right side end portion thereof for being gripped by the left hand and the right hand of a player, respectively. Such a controller 22 as described above has a plurality of operation targets which can be inputted.

In particular, a direction key 222 which can be inputted upwardly, downwardly, leftwardly and rightwardly is disposed at a left side portion of a front face portion 22A of the controller 22, and four buttons 223 are disposed at a right side portion of the front face portion 22A. Further, on the front face portion 22A, a touch pad 224 of the two point detection type and left and right sticks 225 (left and right sticks are represented by 225L and 225R, respectively) are disposed in such a manner as to be sandwiched by the disposition region of the direction key 222 and the disposition region of the buttons 223. The sticks 225 have a joystick structure of two orthogonal axes similar to the analog sticks described hereinabove and have an operation element 2251 tiltable with respect to the front face portion 22A.

Buttons 226 and 227 are disposed leftward and rightwardly on the touch pad 224, and a speaker 228 is disposed at a lower side portion of the touch pad 224.

Two buttons 229L are disposed in a depthwise direction (operation button on the deeper side is not depicted) in the proximity of the left end of an upper face portion 22U of the controller 22, and two buttons 229R are disposed in the depthwise direction similarly (operation button on the deeper side is not depicted) also in the proximity of the right end of the upper face portion 22U.

Such a controller 22 as described above outputs sound corresponding to sound information received from the information processing device 3 from the speaker 28.

Further, the controller 22 transmits, in accordance with an input of any of the direction key 222 and the buttons 223, 226, 227, 229L and 229R, operation information indicative of the type of the inputted key or button. Further, the controller 22 detects an operation position by the player on the touch pad 224 at a predetermined sampling rate and transmits operation information including the coordinates corresponding to the detected operation position.

Figure 3:
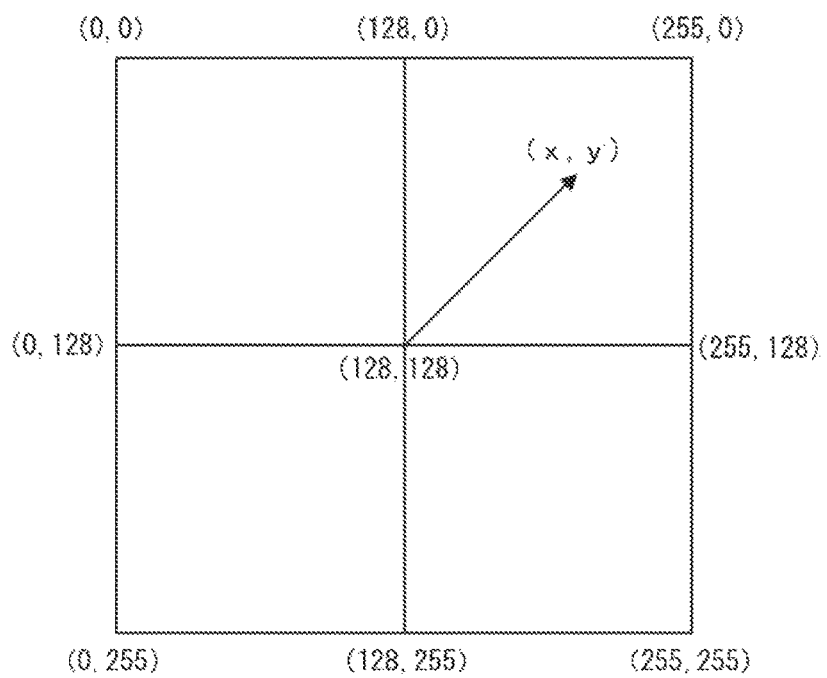
FIG. 3 is a view depicting an input value of a stick in the first embodiment.

FIG. 3 is a view depicting coordinates at which a tilted position of the operation element 251 is indicated.

Further, the controller 22 detects a tilted position of the operation element 2251 of each stick 225 at a predetermined sampling rate and transmits coordinates corresponding to the tilted position. In particular, as depicted in FIG. 3, the controller 22 detects coordinate values (x coordinate value and y coordinate value) of two-dimensional coordinates indicative of a plane position of the operation element 2251 after tilted from a reference position (center position) in the case where the operation element 2251 is not tilted, and the detected coordinate values are transmitted as input values. The x coordinate value and the y coordinate value of the two-dimensional coordinates are individually represented by values equal to or greater than 0 but equal to or smaller than 255. Then, the origin (0, 0) is set to the left upper corner of the two-dimensional coordinate system, and the coordinate values of the reference position described hereinabove are (128, 128).

For example, the coordinate values obtained when the operation element 2251 is tilted most to the right are (255, 128), and the coordinate values obtained when the operation element 2251 is tilted most to the upper side are (128, 0). In this manner, the coordinate values obtained by tilting the operation element 2251 are limited by an upper limit.

It is to be noted that, while the coordinate system depicted in FIG. 3 is used in the present embodiment, the coordinate system is not limited to this. For example, where the point at the left upper corner in FIG. 3 is set as the origin (0, 0), the point at the left upper corner may be represented by (+128, +128) while the point at the right lower corner is represented by (−127, −127). In this instance, the x coordinate value and the y coordinate value are represented by values equal to or greater than −127 but equal to or smaller than 128. Further, the ranges of the x coordinate value and the y coordinate value are individually set to values equal to or greater than 0 but equal to or smaller than 127 or to values equal to or greater than −63 but equal to or smaller than +64.

Operation information transmitted by the controller 22 includes, as input values, type information indicative of the type of the operation target operated among the direction key 222, buttons 223, 226, 227, 229L and 229R, touch pad 224 and sticks 225 which are operation targets and the identification information indicative of the type of the controller 22. Further, when the operated operation target is the touch pad 224 or a stick 225, the coordinate values are included as input values.

[Configuration of Information Processing Device]

Figure 4:
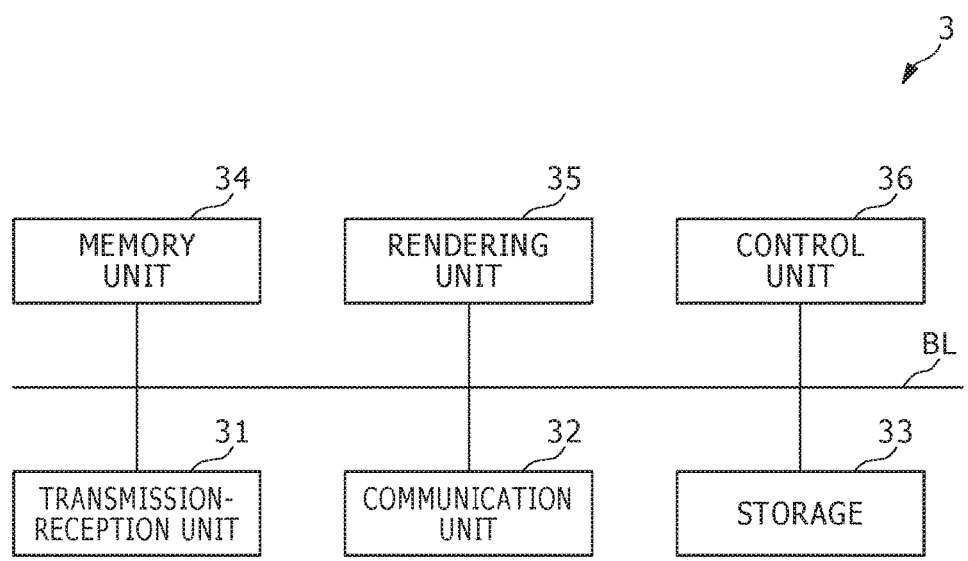
FIG. 4 is a block diagram depicting a configuration of an information processing device in the first embodiment.

FIG. 4 is a block diagram depicting a configuration of the information processing device 3. The information processing device 3 executes an OS and an application and can be configured, for example, from a PC (Personal Computer), a game apparatus or the like.

Such an information processing device 3 as just described includes, as depicted in FIG. 4, a transmission-reception unit 31, a communication unit 32, a storage 33, a memory unit 34, a rendering unit 35 and a control unit 36. The components of the information processing device 3 are connected to each other by a bus line BL.

[Configuration of Transmission-Reception Unit]

The transmission-reception unit 31 is an interface connected to the display apparatus DP and the operation apparatus 2 described hereinabove. The transmission-reception unit 31 transmits an image rendered by the rendering unit 35 hereinafter described to the display apparatus DP. Further, the transmission-reception unit 31 communicates with the operation apparatus 2 to receive the operation information described hereinabove which includes identification information representative of a type of the mouse 21, controller 22 and so forth, type information indicative of a type of an operation target and the input value. Further, if the operation apparatus 2 connected to the information processing device 3 is the controller 22 and besides a sound signal to be outputted from the control unit 36 hereinafter described to the controller 22 is inputted, then the transmission-reception unit 31 transmits the sound signal to the pertaining controller 22.

[Configuration of Communication Unit]

The communication unit 32 communicates with a server 4 (refer to FIG. 1) on a network N under the control of the control unit 36. Then, the communication unit 32 downloads various programs (for example, an update program or a game program) and various data from the server 4 and retains the programs and data into the storage 33. The data to be transmitted and received by the communication unit 32 includes various content data of a video, an audio, an application and so forth.

Further, the communication unit 32 uploads data retained in the storage 33 to the server 4. Such data includes correction information utilized in an adjustment process hereinafter described. Such correction information is stored in an associated relationship with an account of a player, who is a user of the information processing device 3, in a predetermined file format into the server 4.

Also it is possible for such a communication unit 32 as described above to transmit an image rendered by the rendering unit 35 hereinafter described (for example, a screen image upon execution of a game) to the server 4.

[Configuration of Storage]

The storage 33 retains programs such as an OS and game applications for controlling operation of the information processing device 3 and data. As such a storage 33 as just described, a reading apparatus which can read at least data from a disk type recording medium or a memory card and storage apparatus such as an HDD or an SSD (Solid State Drive) can be exemplified. It is to be noted that, in the following description, not only programs and data retained in the storage apparatus but also programs and data read by the reading apparatus are correctively referred to as programs and data retained in the storage 33.

[Configuration of Memory Unit]

The memory unit 34 is configured by including a RAM (Random Access Memory), a VRAM (Video RAM) and so forth and provides working areas for the rendering unit 35 and the control unit 36. Further, in the memory unit 34, at least part of the programs and data retained in the storage 33 are developed. For example, when the information processing device 3 is operative, a program of part of the OS is developed in the memory unit 34, but upon execution of a game application, a program of at least part of the game application is developed.

[Configuration of Rendering Unit]

The rendering unit 35 is configured by including a GPU (Graphics Processing Unit) and so forth and renders an image to be displayed on the display apparatus DP in the memory unit 34 under the control of the control unit 36. For example, the rendering unit 35 renders an operation screen image of the information processing device 3 such as an execution screen image of the OS and an application. Thereupon, the rendering unit 35 renders an image at a frame rate set in advance, for example, at a frame rate set by the OS or a game application.

When the rendering unit 35 renders an execution screen image of an application, the rendering unit 35 renders the execution screen image on the basis of rendering information generated by an application execution unit 36B hereinafter described. For example, the rendering unit 35 renders an image within a field of view of a player character disposed in a virtual three-dimensional space (hereinafter referred to as virtual space) on the basis of the rendering information. Further, the rendering unit 35 decodes a content including image data (still picture or moving picture) acquired from the network N through the communication unit 32 and renders an image corresponding to the decoded content.

[Configuration of Control Unit]

Figure 5:
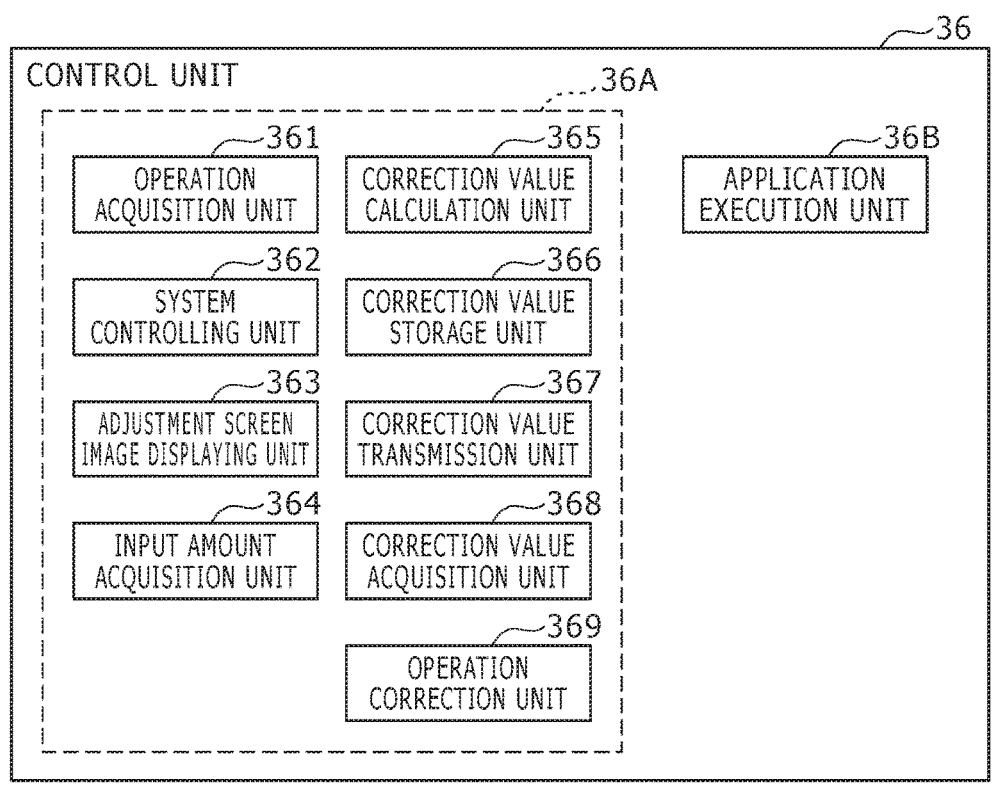
FIG. 5 is a block diagram depicting a configuration of a control unit in the first embodiment.

FIG. 5 is a block diagram depicting a configuration of the control unit 36.

The control unit 36 is configured by including a CPU (Central Processing Unit) and so forth and controls operation of the information processing device 3. This control unit 36 includes, as depicted in FIG. 5, an OS execution unit 36A for executing the OS and an application execution unit 36B for executing an application.

[Function of Application Execution Unit]

The application execution unit 36B corresponds, in the present embodiment, to a processing unit and executes an application or the like designated by the system control unit 362. For example, when a game application is executed, the application execution unit 36B performs progress management of a game based on the game application, construction of a virtual space of the game, setting, movement and rotation of a point of view (virtual camera) in the virtual space, and generation, outputting and so forth of rendering information for causing the rendering unit 35 to render a game screen image. As such a game application as just described, an application of an FPS (First Person Shooter) game can be exemplified in which the point of view in the virtual space is rotated in response to a moving operation of the mouse 21 and a tilting operation of a stick 225 and a game screen image corresponding to the point of view is displayed.

To such an application execution unit 36B as described above, a rotation angle and a rotation direction of the point of view calculated by an operation correction unit 369 hereinafter described on the basis of an input value inputted in accordance with a moving operation of the mouse 21 and an input value inputted in accordance with a tilting operation of a stick 225 are inputted from the OS execution unit 36A. Then, the application execution unit 36B outputs rendering information including the rotation angle and the rotation direction of the point of view to the rendering unit 35 in accordance with a requesting signal inputted from the rendering unit 35 in accordance with the frame rate. In response to the input of such rendering information as described above, the rendering unit 35 renders a game image after the point of view at an immediately preceding point of time in the virtual space is rotated by the rotation angle included in the rendering information in the rotation direction included in the rendering information. Consequently, the game screen image is displayed on the display apparatus DP.

[Function of Operation Acquisition Unit]

The OS execution unit 36A includes an operation acquisition unit 361 and a system control unit 362.

The operation acquisition unit 361 acquires an operation signal and an input value received by the transmission-reception unit 31. Such an operation signal as just described is a signal including a type of an inputted button in addition to information indicative of types of the mouse 21 and the controller 22. Further, the input value includes an acceleration value corresponding to a moving operation of the mouse 21 and an acting direction of the acceleration value or coordinate values corresponding to a tilting operation of the stick 225 (namely, a tilting operation of an operation element 2251). Such an input value as just described is received and acquired in accordance with a sampling rate of the mouse 21 at which an acceleration value is detected or a transmission rate of information by the mouse 21 and a sampling rate of the stick 225 at which a tilting movement of an operation element 2251 is detected or a transmission rate of information by the controller 22.

[Function of System Control Unit]

The system control unit 362 autonomously controls the information processing device 3 on the basis of the OS. Further, the system control unit 362 executes a process in accordance with information (operation signal and input value) acquired from the operation acquisition unit 361. For example, if an operation signal representing that an application retained in the storage 33 is to be executed is acquired by the operation acquisition unit 361, then the system control unit 362 controls the application execution unit 36B to execute the pertaining application.

Further, if sound is to be outputted from the controller 22 in accordance with execution of the OS and the application, the system control unit 362 controls the pertaining controller 22 to output a sound signal through the transmission-reception unit 31.

Meanwhile, the OS execution unit 36A executes an adjustment process (correction value calculation process and operation correction process) for adjusting the processing amount of a process to be executed in accordance with an inputting operation of the operation apparatus 2. This adjustment process is a process of adjusting the processing amount in accordance with an input value of the operation apparatus 2 by a player (user) in conformity with a liking of the player. In particular, the adjustment process is a process of adjusting the rotation angle of the point of view in accordance with an inputting operation for the operation apparatus 2 by the player (user) in conformity with the liking of the player. By such an adjustment process as just described, when an application of the FPS game is executed, it is possible to rotate the point of view in the virtual space of the game by the favorable angle of the player, namely, to rotate the viewing direction of the player indicated by the game screen image leftwardly or rightwardly or upwardly or downwardly in accordance with the favorable input amount of the player.

In order to execute such an adjustment process as described above, in the present embodiment, an adjustment program for causing the adjustment process to be executed is incorporated as a driver for operating the operation apparatus 2 in the OS. The OS execution unit 36A has, as functional units, an adjustment screen image displaying unit 363, an input amount acquisition unit 364, a correction value calculation unit 365, a correction value storage unit 366, a correction value transmission unit 367, a correction value acquisition unit 368 and an operation correction unit 369 implemented by executing the adjustment program.

[Function of Adjustment Screen Image Displaying Unit]

Figure 6:
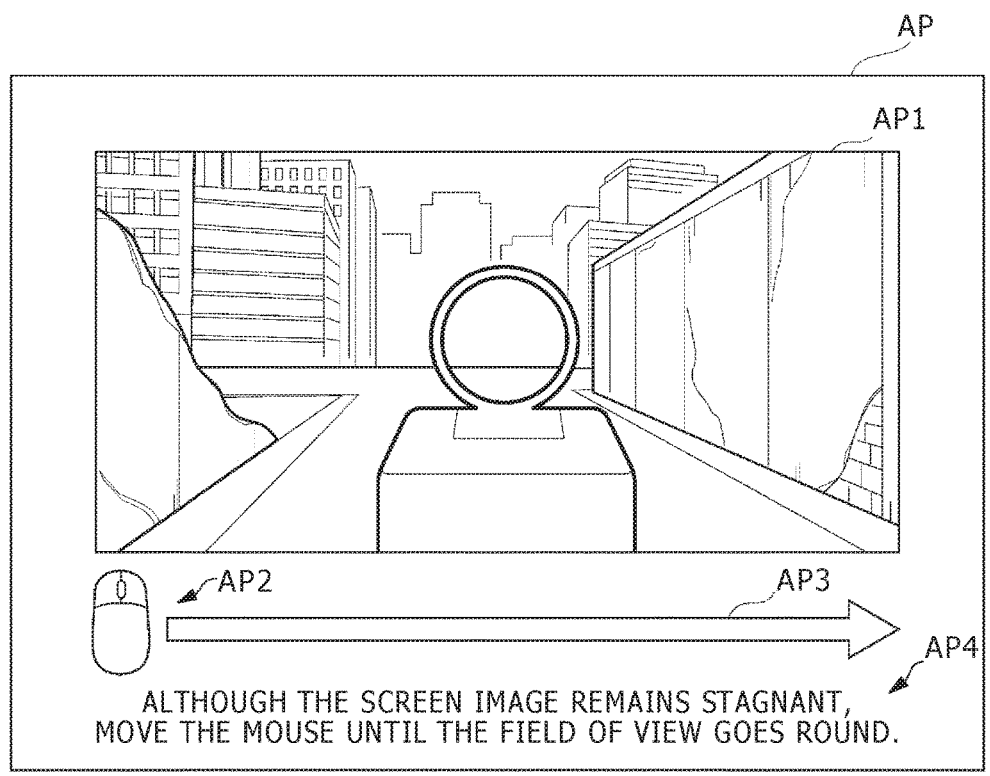
FIG. 6 is a view depicting an example of an adjustment screen image when a mouse is connected in the first embodiment.

FIG. 6 is a view depicting an example of an adjustment screen image displayed when the mouse 21 is connected.

The adjustment screen image displaying unit 363 causes, upon execution of the correction value calculation process, the rendering unit 35 to render an adjustment screen image to be displayed on the display apparatus DP. This adjustment screen image differs depending upon whether the mouse 21 is connected to the information processing device 3 or the controller 22 is connected to the information processing device 3.

When the mouse 21 is connected, the adjustment screen image displaying unit 363 causes, for example, an adjustment screen image AP depicted in FIG. 6 to be rendered. The adjustment screen image AP includes an image setting region AP1 in which an example (still picture) of a play screen image of a game being executed is set, a pattern AP2 which indicates the mouse 21 of an operation target, an arrow mark AP3 indicating a direction in which the mouse 21 is moved, and an explanatory text AP4 of the adjustment screen image AP.

Besides, when the controller 22 is connected, though not depicted, the adjustment screen image displaying unit 363 causes an adjustment screen image to be rendered and displayed in which the pattern AP2 in the adjustment screen image AP is replaced with a pattern depicting the controller 22 and the explanatory text AP4 is replaced with an explanatory text: "Although the screen image remains stagnant, tilt the stick in the direction of the arrow until the field of view goes round."

It is to be noted that the format of the adjustment screen image to be rendered and displayed is not limited to that of the adjustment screen image described above. For example, an adjustment screen image in which a moving picture when the point of view of the player in the virtual space (point of view of an image rendered in the virtual space and set to the play screen image) goes round is set in the image setting region AP1 and which includes, in place of the explanatory text AP4, an explanatory text: "Move the mouse similarly to try to cause the field of view to go round" may be rendered and displayed. Where the controller 22 is connected, the pattern AP2 in the adjustment screen image is replaced with a pattern indicative of the controller 22.

Further, in the adjustment screen image described above, the moving direction of the mouse 21 moved by the player may be indicated by an arrow mark or the like, and the detected amount of movement of the mouse 21 may be displayed. If such display is given, then it is made possible to recognize in which direction and by what amount the mouse 21 is moved by the player. This similarly applies also to the adjustment screen image which is displayed when the controller 22 is connected.

The input amounts of the mouse 21 and the stick 225 acquired upon display of such adjustment screen images and the speed at which the player character rotates the field of view in a moving picture set to the image setting region AP1 do not coincide with each other.

[Function of Input Amount Acquisition Unit]

The input amount acquisition unit 364 acquires an input amount of the operation apparatus 2 acquired by the operation acquisition unit 361 when the adjustment screen image described hereinabove is displayed.

In particular, where the mouse 21 is connected, the input amount acquisition unit 364 acquires, as an input amount for causing, when the adjustment screen image is to be displayed, the process for causing the point of view to go round (process for rotating the point of view by a predetermined angle, namely, 360 degrees), an integration value of the input value within a period within which the moving operation of the mouse 21 is performed and the input value then is acquired, namely, an integration value of the speed based on the acceleration within the period. It is to be noted that, when the mouse 21 is connected, the input amount corresponds to an integration value of the rotation angle of the point of view rotated in accordance with the input value, namely, to a processing amount for rotating the point of view in accordance with the inputting operation.

Figure 7:
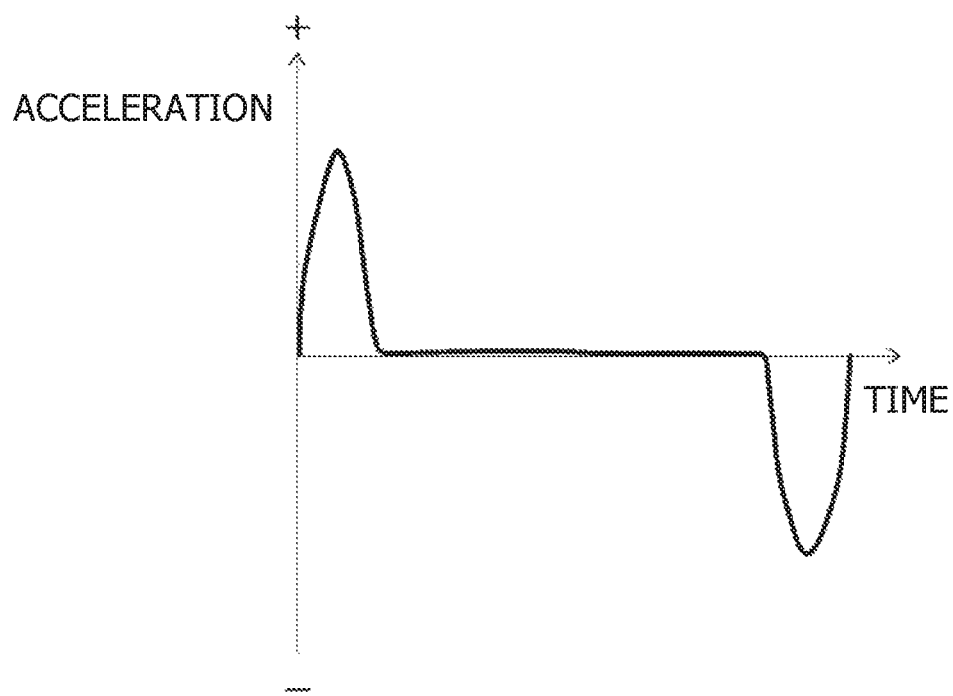
FIG. 7 is a view depicting an example of increase or decrease of an acceleration value inputted upon a moving operation of the mouse in the first embodiment.

FIG. 7 is a view depicting an example of increase/decrease of the acceleration value inputted upon a moving operation of the mouse 21.

Here, if a moving operation of the mouse 21 is started, then the acceleration value in the moving direction of the mouse 21 becomes fixed after the acceleration value increases and decreases suddenly as depicted in FIG. 7. Thereafter, when the mouse 21 is stopped, the acceleration value in the opposite direction to the moving direction of the mouse 21 is fixed after the acceleration value increases and decreases suddenly.

Figure 8:
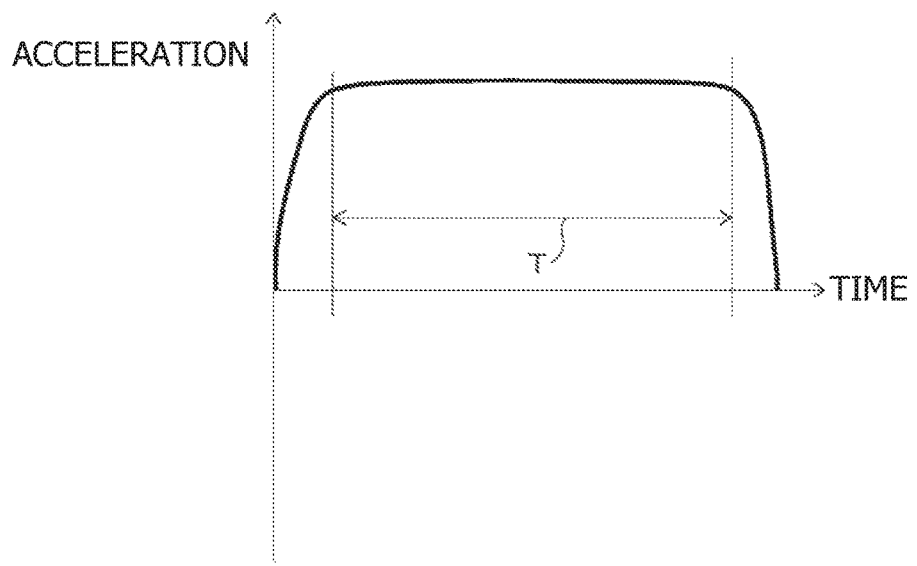
FIG. 8 is a view depicting an example of an input amount of the mouse in the first embodiment.

FIG. 8 is a view depicting an example of an input amount of the mouse 21.

Thus, the input amount acquisition unit 364 acquires an integration value of the speed within a period within which the acceleration value is fixed upon a moving operation of the mouse 21 as an input amount for causing the point of view to go round using the mouse 21. For example, the input amount acquisition unit 364 acquires an integration value of the speed within a period T in FIG. 8 as the input amount.

In this manner, in the present embodiment, the input amount acquisition unit 364 acquires an integration value of the speed within a period within which the acceleration value is fixed upon a moving operation of the mouse 21 as the input value described hereinabove. In other words, the input amount does not include the speed when a sudden variation occurs with the acceleration value. This is because a stabilized input value is acquired by ignoring a sudden variation of the acceleration value, namely, by ignoring the input value upon starting and ending of the movement upon the moving operation of the mouse 21, and by this, a rotation process of the point of view in accordance with an operation not intended by the player is not performed while occurrence of wobbling of the point of view (namely, blurring of a screen image) is prevented.

Besides, where the controller 22 is connected to the information processing device 3, the input amount acquisition unit 364 acquires an input amount for causing the point of view to go round on the basis of a period (operation period) within which the operation member of a stick 225 which is operated by the player is tilted and a rotation angle of the point of view in accordance with the coordinate values acquired within the period.

In particular, the input amount acquisition unit 364 calculates, upon display of the adjustment screen image, a rotation amount which is an angle in the form of an integration value of the rotation angle of the point of view on the basis of the acquired coordinate values and the operation period of the stick 225 and acquires the rotation amount as an input amount of the stick 225. This input amount corresponds to an input amount favorable to the player when the point of view goes round. In other words, the input amount acquisition unit 364 acquires, as an input amount for causing the point of view to go round, a rotation amount of the point of view rotated by an operation of the stick 225 by the player upon display of the adjustment screen image.

It is to be noted that, also where the controller 22 is connected, the input amount acquisition unit 364 ignores an input value upon starting and upon ending of movement by the tilting operation of the stick 225 (input value when the acceleration value acting upon the operation element 2251 in response to a tilting motion of the operation element 2251 varies suddenly).

[Function of Correction Value Calculation Unit]

The correction value calculation unit 365 calculates a correction value for correcting a rotation angle of the point of view which is a processing amount in accordance with a moving operation of the mouse 21 and a tilting operation of the stick 225 on the basis of an input amount acquired by the input amount acquisition unit 364.

For example, when the mouse 21 is connected, the correction value calculation unit 365 acquires, as a correction value, a result when a reference amount which is set in advance in the game being executed and is set in advance as an input amount required to cause the point of view to go round by a moving operation of the mouse 21 is divided by an input amount acquired by the input amount acquisition unit 364.

When the controller 22 is connected, the correction value calculation unit 365 calculates a correction value for correcting a rotation angle of the point of view calculated from an input value (coordinate value) in accordance with a tilting operation of the stick 225 on the basis of a rotation amount which is an input amount acquired from the input amount acquisition unit 364. For example, the correction value calculation unit 365 acquires, as a correction value, a result when 360 degrees (reference amount which is a rotation amount for one round of the point of view of the player character) are divided by an acquired rotation amount (rotation amount which is an angle calculated from the input amount acquired when the adjustment screen image is displayed).

It is to be noted that, when it is possible, in a game application being executed, to select an Fov (field of view) value indicative of an angle of field which is a range of rendering, the calculation process of the correction value described above is performed for each selectable Fov value. Further, on the adjustment screen image, the player may be caused to carry out a moving operation of the mouse 21 and a tilting operation of a stick 225 by a plural number of times such that the correction value calculation unit 365 calculates a correction value based on an average value of the input amount, or an average value of the correction values may be calculated as a correction value.

Furthermore, the correction value calculation unit 365 may calculate the correction value using not the methods described but some different method.

[Function of Correction Value Storage Unit]

The correction value storage unit 366 retains correction information including a correction value calculated by the correction value calculation unit 365 into the storage 33. In particular, the correction value storage unit 366 retains a calculated correction value, identification information of a game application being executed, the Fov value described above if this is selectable and correction information associated with the account of the player in a predetermined file format.

[Function of Correction Value Transmission Unit]

The correction value transmission unit 367 uploads the correction information described above to the server 4 on the network N through the communication unit 32 such that the correction information is stored into the server 4. Consequently, the server 4 retains the correction value for each game application and for each Fov value in an associated relationship with the account of the player.

[Function of Correction Value Acquisition Unit]

The correction value acquisition unit 368 and the operation correction unit 369 function upon execution of an operation correction process in the adjustment process described hereinabove. The operation correction process is a process of correcting the rotation angle of the point of view in accordance with an input value acquired from the operation apparatus 2 to a rotation angle favorable to the user on the basis of the correction value described hereinabove.

The correction value acquisition unit 368 acquires, from correction information retained in the storage 33, the account of a player at present, an application being executed and a correction value in accordance with an Fov value. Here, if the pertaining correction value is not retained in the storage 33, then the correction value acquisition unit 368 communicates with the server 4 as an external apparatus through the communication unit 32 to acquire the pertaining correction value from the server 4. It is to be noted that, when the pertaining correction value is not retained in any of the storage 33 and the server 4, the correction value acquisition unit 368 notifies the operation correction unit 369 that the correction value acquisition unit 368 fails to acquire a correction value.

[Function of Operation Correction Unit]

If a correction value is acquired by the correction value acquisition unit 368, then the operation correction unit 369 corrects the rotation angle of the point of view in accordance with an input value on the basis of the correction value to correct the sensitivity (responsiveness) of the operation apparatus 2.

Figure 9:
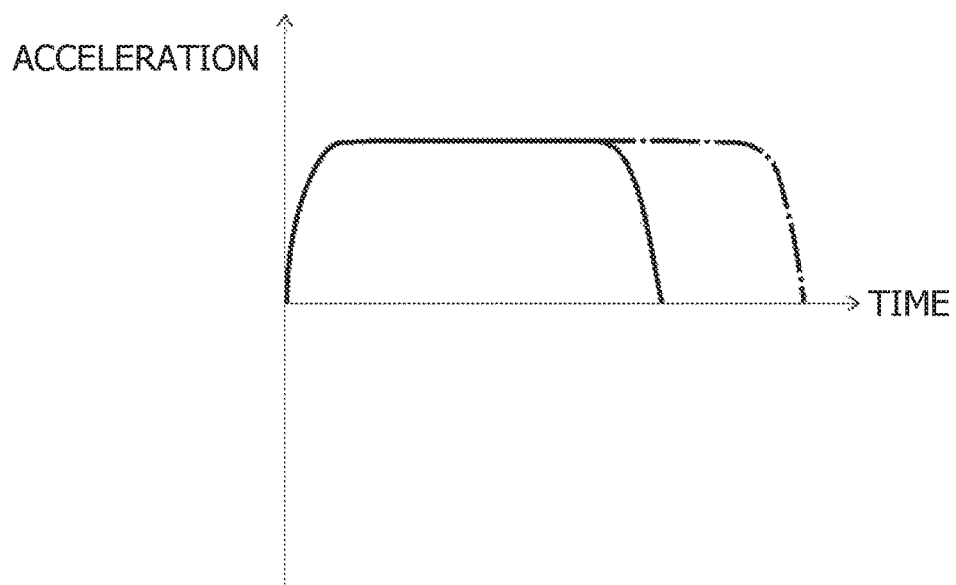
FIG. 9 is a view depicting an example of a relationship between a reference amount required to cause a point of view of a player character to go round upon a moving operation of the mouse and an acquired input amount in the first embodiment.

FIG. 9 is a view depicting an example of a relationship between a reference amount required to cause the point of view to go round upon a moving operation of the mouse 21 and an input amount acquired by the input amount acquisition unit 364.

For example, the input value favorable to the player (input amount acquired by the input amount acquisition unit 364) for causing the point of view to go round is sometimes smaller than the reference amount, which is indicated by an alternate long and short dash line in the figure, as indicated by a solid line in FIG. 9. In this case, the point of view does not go round with the input amount.

Similarly, when the input amount favorable to the player is greater than the reference amount, the point of view rotates by more than one round.

Where the input amount favorable to the player and the reference amount do not coincide with each other in this manner, since the rotation amount of the point of view is smaller or greater, the point of view is less likely to be directed in a favorable direction and the player will play the game while feeling some stress.

Figure 10:
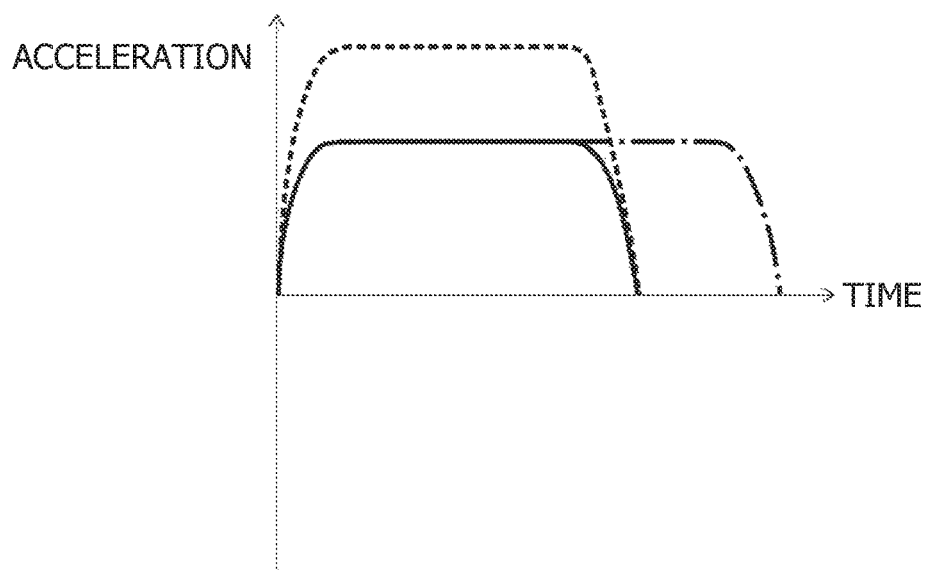
FIG. 10 is a view depicting a relationship among the reference amount, an input amount and the input amount after correction in the first embodiment.

FIG. 10 is a view depicting an example of a relationship among the reference amount, an input amount acquired by the input amount acquisition unit 364 and the input amount after correction by the operation correction unit 369.

In contrast, when the mouse 21 is connected, the operation correction unit 369 can make the input amount after correction and the reference amount coincide with each other by correcting the input value using the correction value. For example, by correcting the input amount indicated by a solid line in FIGS. 9 and 10, the input amount (integration value) after correction indicated by a broken line in FIG. 10 and the reference amount (integration value) can be made coincide with each other. Consequently, the player can cause the point of view to go round by moving the mouse 21 by an input amount favorable to the player.

Actually, every time an input value in accordance with a moving operation of the mouse 21 is acquired by the operation acquisition unit 361, the operation correction unit 369 corrects the input value using the correction value described above. Then, the operation correction unit 369 calculates a rotation angle and a rotation direction of the point of view from the input value after correction. Then, the application execution unit 36B receives the rotation angle and the rotation direction from the OS execution unit 36A and outputs rendering information including the rotation angle and the rotation direction to the rendering unit 35. Consequently, an image when the point of view is rotated by the rotation angle in the rotation direction is rendered and displayed on the display apparatus DP.

It is to be noted that the operation correction unit 369 suppresses a sudden rotation of the point of view by performing the correction described above for the integration value of the speed when the acceleration value is considered fixed ignoring a sudden variation of the acceleration value of the input value acquired as described above.

Figure 11:
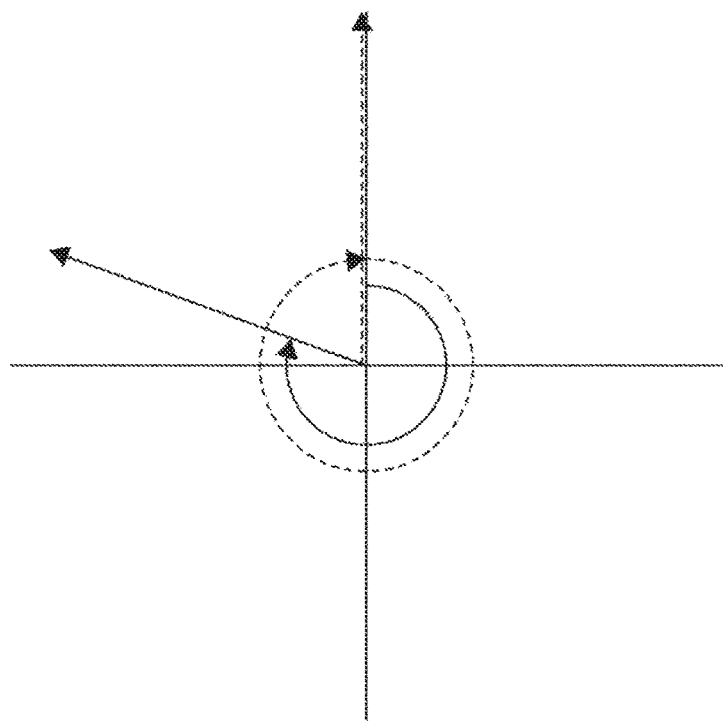
FIG. 11 is a view depicting an example of a rotational angle based on an input amount acquired when an adjustment screen image is displayed in the first embodiment.

FIG. 11 is a view depicting an example of the rotation angle based on an input amount acquired by the input amount acquisition unit 364 when the player operates a stick 225 upon displaying of the adjustment screen image in order to cause the point of view of a player character to go round. Meanwhile, the input amount acquired when the player operates the stick 225 as an operation for causing the point of view to go round in a virtual space, namely, the rotation amount which is a rotation angle in accordance with an input amount favorable to the player, is sometimes smaller than 360 degrees of the reference amount as indicated by a solid line arrow mark in FIG. 11. In this case, the point of view does not go round with the input amount.

Similarly, where the rotation amount which is a rotation angle in accordance with the input amount is greater than 360 degrees, the point of view rotates exceeding one round.

Where the input amount favorable to the player and the reference amount do not coincide with each other in this manner, the point of view is less likely to be directed in a favorable direction, and the player will play the game while feeling some stress.

In contrast, when an input value in accordance with a tilting operation of the stick 225 is acquired, the operation correction unit 369 first calculates a rotation angle and a rotation direction of the point of view from the acquired input value. Then, the operation correction unit 369 corrects the calculated rotation angle using the correction value. Consequently, the rotation amount after correction can be made coincide with 360 degrees of the reference amount as indicated by a broken line arrow mark in FIG. 11. Accordingly, the player can make the rotation amount of the point of view coincide with 360 degrees of the reference amount by an input amount to the stick 225 favorable to the player, and the point of view can be made go round thereby.

Figure 12:
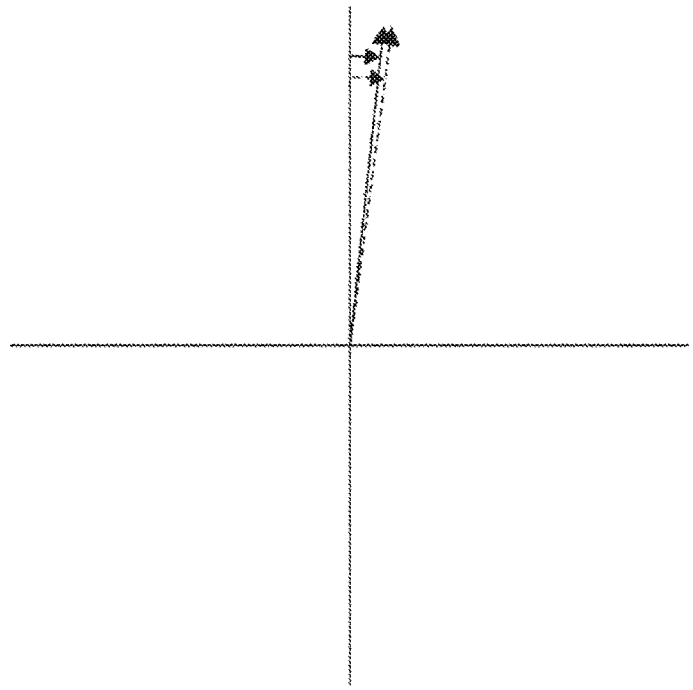
FIG. 12 is a view depicting an example of a relationship between a rotational angle in accordance with an input value and the rotational angle after correction in the first embodiment.

FIG. 12 is a view depicting an example of a relationship between a rotation angle in accordance with an input value acquired in response to an operation for the stick 225 and the rotation angle after correction.

Actually, every time an input value in accordance with a tilting operation of the stick 225 is acquired by the operation acquisition unit 361, the operation correction unit 369 calculates a rotation angle and a rotation direction from the input value and corrects the rotation angle using the correction value described above. Therefore, the rotation angle in accordance with the input value indicated by a solid line arrow mark in FIG. 12 is corrected to a rotation angle indicated by a broken line arrow mark in the figure. Then, the application execution unit 36B outputs rendering information including the rotation angle and the rotation direction to the rendering unit 35, and consequently, an image in which the point of view is rotated by the rotation angle in the rotation direction is rendered and displayed on the display apparatus DP.

Such an operation correction unit 369 as described above does not correct, when the correction value acquisition unit 368 fails to acquire a correction value, the input value and the rotation angle in accordance with the input value. Therefore, the operation correction unit 369 calculates a rotation angle and a rotation direction from the acquired input value, and the application execution unit 36B outputs rendering information including the rotation angle and the rotation direction to the rendering unit 35.

Here, the application execution unit 36B outputs the rendering information in response to an requesting signal inputted in accordance with a frame rate of the rendering unit 35. Therefore, the frequency of the acquisition and correction processes is sometimes higher than the output frequency of rendering information by the application execution unit 36B. In other words, the acquisition and correction processes of an input value are sometimes executed by a plural number of times within a period after a requesting signal is inputted to the application execution unit 36B until a new requesting signal is inputted.

In this case, the application execution unit 36B processes the input values acquired within the period after the requesting signal is inputted until the new requesting signal is inputted, and outputs rendering information including a rotation angle and a rotation direction obtained by totaling results of the processing. Consequently, even when the reception and acquisition frequency of an operation signal is higher than the frame rate of the rendering unit 35 or when the frame rate is variable, rotation of the point of view in accordance with an operation of the mouse 21 and the stick 225 can be implemented.

[Adjustment Process]

Figure 13:
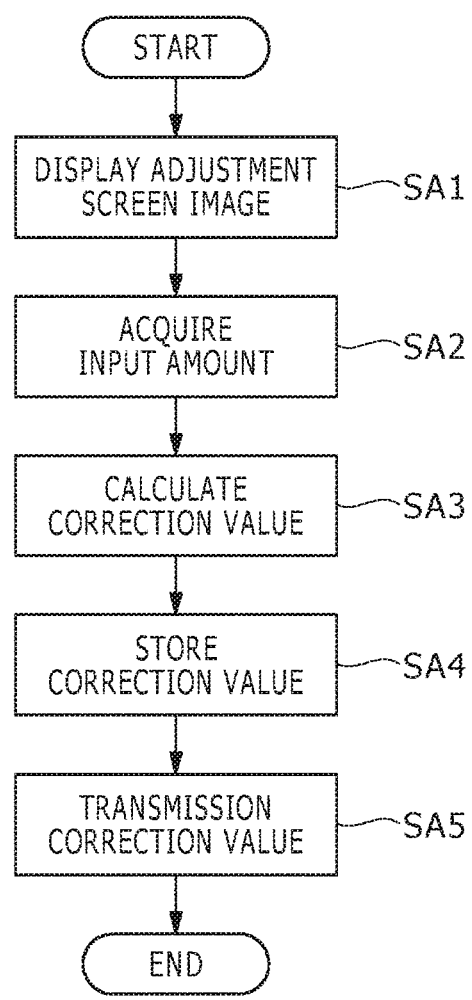
FIG. 13 is a flow chart illustrating a correction value calculation process in the first embodiment.

FIG. 13 is a flow chart illustrating a correction value calculation process included in the adjustment process.

As described hereinabove, the control unit 36 executes an adjustment process including a correction value calculation process and an operation correction process. Out of the processes, the correction value calculation process is performed, for example, in the following procedure. In the correction value calculation process, as depicted in FIG. 13, the adjustment screen image displaying unit 363 first causes the adjustment screen image described hereinabove to be displayed (step SA1).

Then, the input amount acquisition unit 364 acquires the input amount described hereinabove of the operation apparatus 2 (mouse 21 or controller 22) when the adjustment screen image is displayed (step SA2).

Thereafter, the correction value calculation unit 365 calculates the correction value on the basis of the acquired input amount or on the rotation amount which is a rotation angle in accordance with the input amount and the reference value described above (step SA3).

Then, the correction value storage unit 366 stores the calculated correction value (step SA4) and the correction value transmission unit 367 transmits the correction value to the server 4 so as to be retained into the server 4 (step SA5).

The correction vale calculation process is ended therewith.

Figure 14:
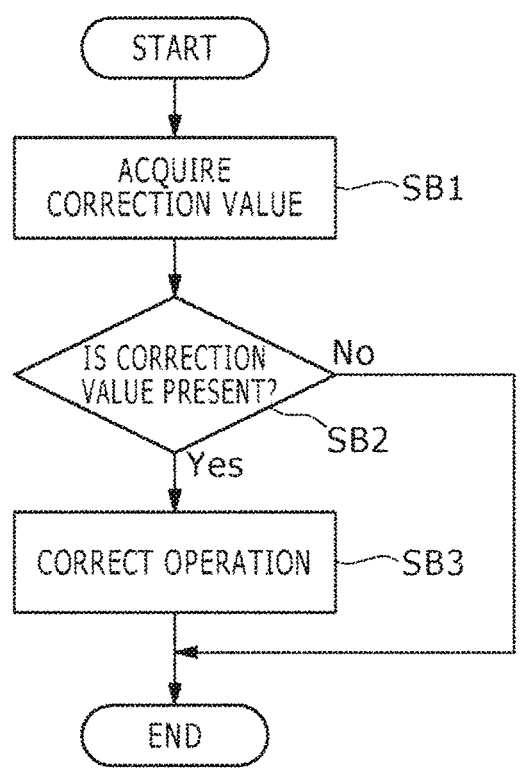
FIG. 14 is a flow chart illustrating an operation correction process in the first embodiment.

FIG. 14 is a flow chart illustrating an operation correction process included in the adjustment process.

In the operation correction process, as illustrated in FIG. 14, the correction value acquisition unit 368 first acquires a pertaining correction value from the storage 33 or the server 4 (step SB1). Thereafter, the operation correction unit 369 decides on the basis of a result of the acquisition by the correction value acquisition unit 368 whether or not a correction value is acquired (step SB2). Here, if a correction value is not acquired, then the operation correction process is ended therewith. In this case, the operation correction unit 369 calculates the rotation angle and the rotation direction from the input value acquired by the operation acquisition unit 361 without executing the correction process and outputs the rotation angle and the rotation direction to the application execution unit 36B. Then, rendering information including the rotation angle and the rotation direction is generated by the application execution unit 36B and is outputted to the rendering unit 35 in accordance with the requesting signal described hereinabove.

On the other hand, if it is decided that a correction value is acquired, then the operation correction unit 369 processes the input value acquired by the operation acquisition unit 361 to correct the rotation angle of the point of view in such a manner as described hereinabove (step SB3). In particular, the operation correction unit 369 corrects the input value acquired in accordance with the moving operation of the mouse 21 on the basis of the correction value and corrects the rotation angle in accordance with the input value acquired in accordance with the tilting operation of the stick 225 on the basis of the correction value.

The operation correction process ends therewith. It is to be noted that generation of rendering information by the application execution unit 36B is similar to that described hereinabove.

Effect of First Embodiment

With the information processing system 1 according to the present embodiment described hereinabove, the following effects are achieved.

Since the correction value for correcting the rotation angle of the point of view based on an acquired input value such that the rotation angle becomes equal to a rotation angle favorable to a player (user) is used, the operation correction unit 369 can rotate the point of view by a rotation angle favorable to the user in accordance with an inputting operation for the operation apparatus 2. Accordingly, the rotation angle of the point of view in accordance with the inputting operation for the operation apparatus 2 can be corrected to the rotation angle favorable to the user.

The correction value calculation unit 365 calculates a correction value on the basis of an input amount or a rotation amount in accordance with an inputting operation actually performed by the player in order to cause the point of view to go round and a reference amount set in advance as an inputting amount or a rotation amount for causing the point of view to go round. With the calculation, since the correction value is calculated on the basis of an actual inputting operation of the player, the rotation angle in accordance with the input value acquired in accordance with the inputting operation can be corrected with certainty to the rotation angle favorable to the user. Accordingly, the inputting operation for rotation of the point of view can be carried out readily.

The acceleration value detected by the mouse 21 upon an inputting operation differs by a great amount among different users who operate the mouse 21. Therefore, even if it is tried to correct the rotation angle in accordance with an integration value of the speed calculated on the basis of the acceleration value using a correction value set in advance, it is difficult to correct the rotation angle to a rotation angle in accordance with the favor of the user.

In contrast, since a correction value is calculated in accordance with an actual inputting operation of the user, even with an operation apparatus which detects an acceleration value, the rotation angle can be corrected with certainty for each user to a rotation angle in accordance with an input value favorable to the user.

The correction value calculation unit 365 acquires a rotation amount which is an integration value of the rotation angle in accordance with coordinate values by a tilting operation of the stick 225 which is performed as an operation for causing the point of view to go round as an input amount and calculates a correction value on the basis of the input amount and 360 degrees of the reference amount. Then, the operation correction unit 369 corrects the rotation angle in accordance with the coordinate values acquired from the controller 22 on the basis of the correction value. With this, since the rotation angle in accordance with the coordinate values is corrected, the rotation angle can be corrected with certainty to a rotation angle in accordance with an input value favorable to the user.

When a pertaining correction value is not retained in the storage 33, the correction value acquisition unit 368 acquires the pertaining correction value from the server 4 as an external apparatus. Then, the operation correction unit 369 executes the correction process described hereinabove on the basis of the acquired correction value. With this, when a new information processing device 3 or a different information processing device 3 is used, when a correction value stored in the information processing device 3 is deleted (including a case in which the OS is re-installed into the information processing device) or in a like case, the operation correction process can be executed using the acquired correction value without repetitively executing the calculation process after correction again.

If the OS execution unit 36A which executes the OS executes the adjustment process described hereinabove, then the operability of the operation apparatus 2 between different applications to be executed by the application execution unit 36B can be made common easily. Further, since there is no necessity to incorporate a program for executing the adjustment process for each application, the development step of the application can be simplified.

First Modification to First Embodiment

In the information processing system 1 described above, the OS execution unit 36A includes the functional units 363 to 369, and the adjustment process (correction value calculation process and operation correction process) is processed by the OS execution unit 36A and a rotation angle and a rotation direction which are a result of the processing are outputted to the application execution unit 36B. However, the configuration of the information processing system 1 is not limited to this, and the functional units 363 to 369 may be provided otherwise in the application execution unit 36B.

Figure 15:
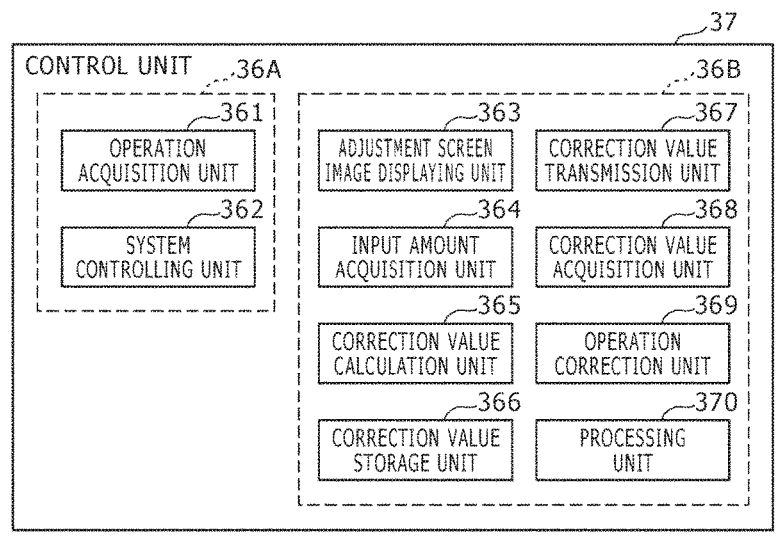
FIG. 15 is a block diagram depicting a configuration of a control unit of an information processing device which an information processing system which is a modification to the information processing system in the first embodiment has.

FIG. 15 is a block diagram depicting a configuration of a control unit 37 of an information processing device provided in an information processing system which is a modification to the information processing system 1 described hereinabove.

The information processing system which is a modification to the information processing system 1 has a configuration similar to that of the information processing system 1 except that it includes an information processing device 3 which includes the control unit 37 in place of the control unit 36.

The control unit 37 includes an OS execution unit 36A and an application execution unit 36B and has functions similar to those of the control unit 36. The OS execution unit 36A of the control unit 37 includes an operation acquisition unit 361 and a system control unit 362 described hereinabove, and the application execution unit 36B includes an adjustment screen image displaying unit 363, an input amount acquisition unit 364, a correction value calculation unit 365, a correction value storage unit 366, a correction value transmission unit 367, a correction value acquisition unit 368 and an operation correction unit 369 as depicted in FIG. 15. The application execution unit 36B further includes a processing unit 370 which performs a process similar to that of the application execution unit 36B. In other words, in the present embodiment, the adjustment process is executed by the application execution unit 36B which executes an application.

With the information processing system according to the present embodiment described above, effects similar to those of the information processing system 1 can be achieved, and the following effect can be achieved additionally.

Second Modification to First Embodiment

In the information processing systems described above, the application execution unit 36B which executes an application such as an application for an FPS game described hereinabove executes processes for configuration of a virtual space, rotation of the point of view in the virtual space and so forth.

However, the configuration of a virtual space and the rotation of the point of view of a player character based on a result of processing by the operation correction unit 369 may be executed by the OS execution unit 36A (for example, by the system control unit 362). In this case, the application execution unit 36B may be configured such that it acquires a result of the process by the OS execution unit 36A (for example, coordinates in the virtual space indicative of the point of view of the player character after rotation) to execute an application.

Second Embodiment

Now, a second embodiment is described.

Here, in the information processing system 1 described hereinabove, the information processing device 3 corrects an input value from the operation apparatus 2 on the basis of a correction value. In contrast, in the information processing system according to the present embodiment, the information processing device converts operation information in accordance with an operation for an operation apparatus into operation information in accordance with a different operation. In this regard, the information processing system according to the present embodiment and the information processing system 1 are different from each other. It is to be noted that, in the following description, like or substantially like elements to those described hereinabove are denoted by like reference characters and description of them is omitted herein.

[General Configuration of Information Processing System]

Figure 16:
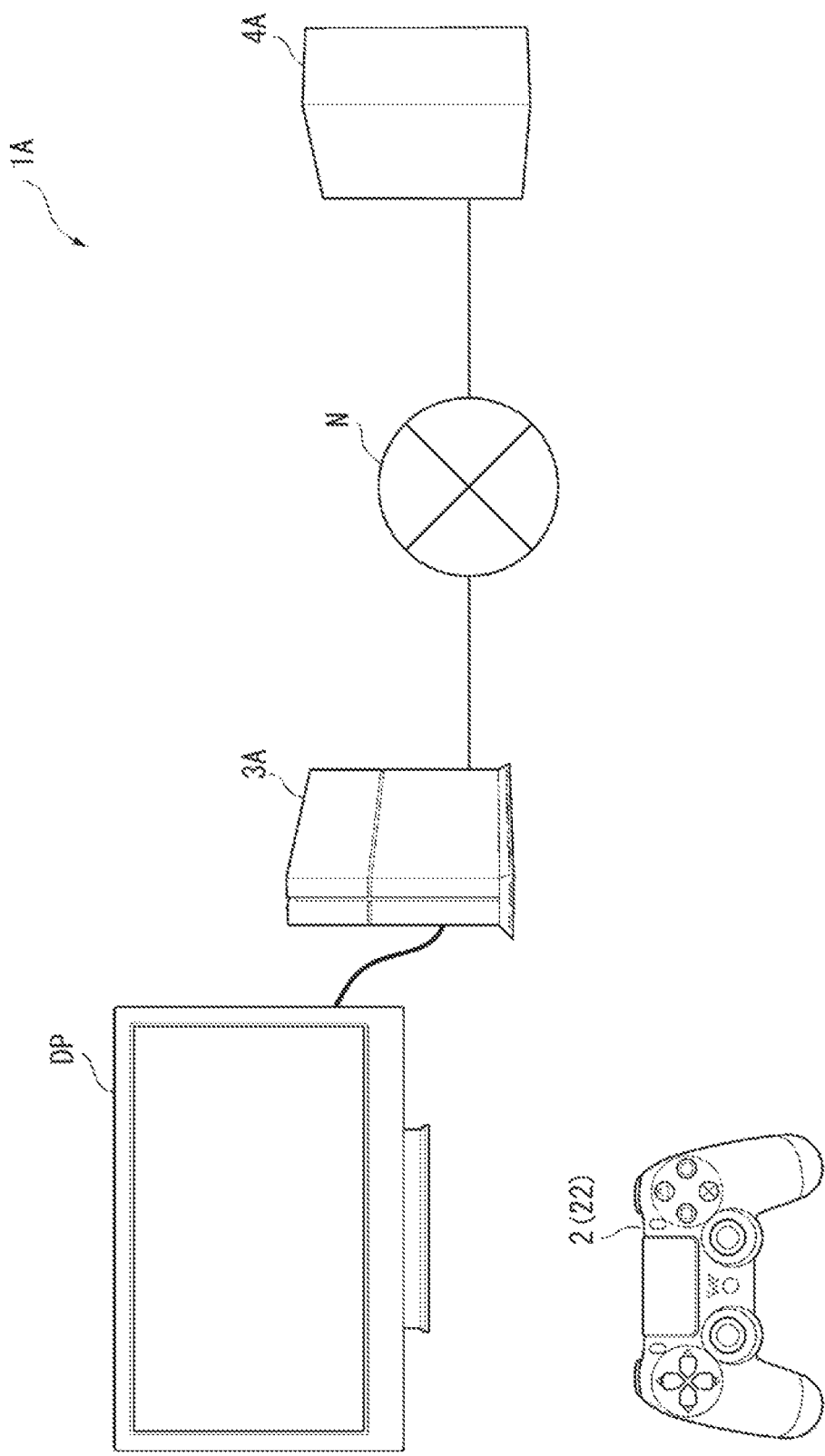
FIG. 16 is a schematic view depicting a configuration of an information processing system according to a second embodiment.

FIG. 16 is a schematic view depicting a configuration of an information processing system 1A according to the present embodiment.

The information processing system 1A according to the present embodiment includes, as depicted in FIG. 16, an operation apparatus 2 (controller 22), an information processing device 3A and a display apparatus DP, and a server 4A connected for communication to the information processing device 3A through a network N. In the present information processing system 1A, the information processing device 3A executes a predetermined application (for example, a game application) in response to operation information received from the operation apparatus 2. Thereupon, if operation information in accordance with an inputting operation set in advance from among inputting operations for the operation apparatus 2 is received, then the information processing device 3A converts the operation information into operation information in accordance with a different inputting operation set in advance and executes a process in accordance with the operation information after conversion.

Configurations of the information processing system 1A will be described below.

[Configuration of Information Processing Device]

Figure 17:
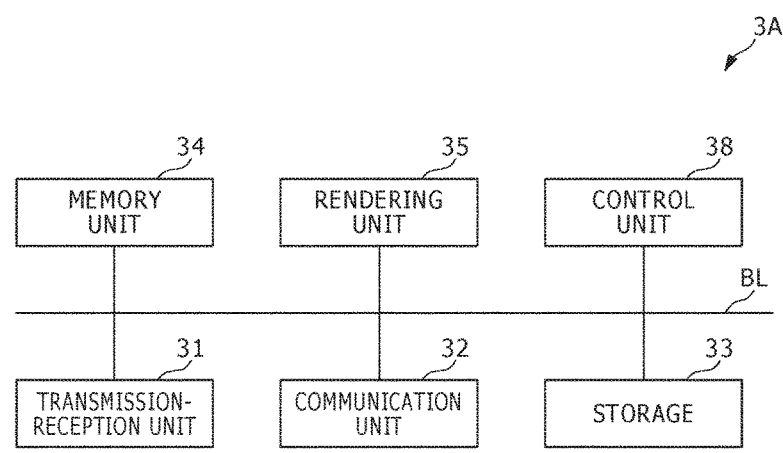
FIG. 17 is a block diagram depicting a configuration of an information processing device in the embodiment.

FIG. 17 is a block diagram depicting a configuration of the information processing device 3A. The information processing device 3A executes an OS and an application and executes a process in accordance with operation information received from the operation apparatus 2 similarly to the information processing device 3. The information processing device 3A is configured, for example, from a PC or a game apparatus.

Such an information processing device 3A as just described includes, as depicted in FIG. 17, a transmission-reception unit 31, a communication unit 32, a storage 33, a memory unit 34, a rendering unit 35 and a control unit 38, which are connected to each other by a bus line BL.

[Configuration of Control Unit]

Figure 18:
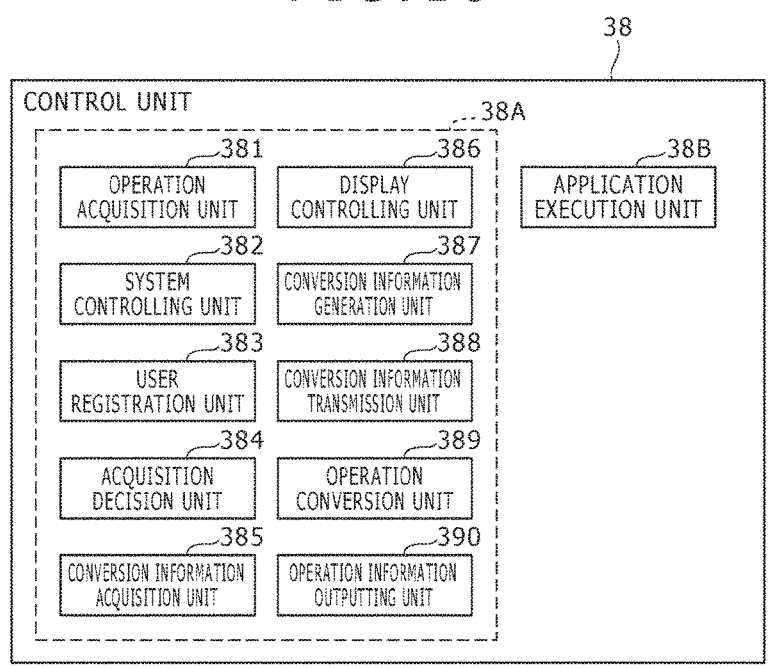
FIG. 18 is a block diagram depicting a configuration of a control unit in the embodiment.

FIG. 18 is a block diagram depicting a configuration of the control unit 38.

The control unit 38 is configured by including a CPU and so forth and controls operation of the information processing device 3A. The control unit 38 includes, as depicted in FIG. 5, an OS execution unit 38A (corresponding to a main control unit) for executing the OS as a control program, and an application execution unit 38B (corresponding to an execution unit) for executing an application.

Out of the components, the OS execution unit 38A includes, as functional units, an operation acquisition unit 381, a system controlling unit 382 and a user registration unit 383 individually implemented by execution of the OS by the CPU.

[Function of Operation Acquisition Unit]

The operation acquisition unit 381 acquires operation information received by the transmission-reception unit 31. Such operation information is received and acquired from the controller 22 in accordance with an input (depression) of any of the direction key 222 and the buttons 223, 226, 227, 229L and 229R or in accordance with an operation of the touch pad 224 or a stick 225.

[Function of System Controlling Unit]

The system controlling unit 382 autonomously controls the information processing device 3 on the basis of the OS and further executes a process in accordance with acquired information. For example, if operation information for causing an application retained in the storage 33 to be executed is acquired, then the system controlling unit 382 controls the application execution unit 38B to execute the pertaining application.

Further, if sound is to be outputted from the operation apparatus 2 (controller 22) in accordance with execution of the OS and the application, the system controlling unit 382 controls the pertaining operation apparatus 2 to output sound information through the transmission-reception unit 31.

[Function of User Registration Unit]

The user registration unit 383 retains user information which is information relating to a user into the storage 33 thereby to register the user information. Further, the user registration unit 383 transmits the user information to the server 4A connected thereto through the communication unit 32 to register the user information into the server 4A. Such user information as described above includes, in addition to the account of the user, information indicative of a type of an operation apparatus owned by the user and a type of the operation apparatus 2 connected at present to the information processing device 3A.

[Other Functional Units of OS Execution Unit]

The OS execution unit 38A executes, in order to cause the application execution unit 38B to recognize a predetermined inputting operation performed for the operation apparatus 2 as a different inputting operation to perform a process when a predetermined application is to be executed by the application execution unit 38B, an operation conversion process of converting operation information received from the operation apparatus 2 and outputting the operation information after conversion to the application execution unit 38B. To this end, the OS execution unit 38A has, as functional units, an acquisition decision unit 384, a conversion information acquisition unit 385, a display controlling unit 386, a conversion information generation unit 387, a conversion information transmission unit 388, an operation conversion unit 389 and an operation information outputting unit 390, which are implemented by the CPU executing an operation conversion program included in the OS.

It is to be noted that, in the case where a setting operation by which the operation conversion process is not to be performed is performed by the user or in the case where an application to be executed by the application execution unit 38B is not compatible with the operation conversion process, the operation conversion process is not executed.

[Function of Acquisition Decision Unit]

The acquisition decision unit 384 decides whether or not conversion information to be utilized for the operation conversion process by the operation conversion unit 389 hereinafter described is retained in the storage 33.

Further, if the acquisition decision unit 384 decides that the conversion information is not retained in the storage 33, then the acquisition decision unit 384 communicates with the server 4A through the communication unit 32 to decide whether or not the server 4A retains conversion information corresponding to the account of the user who uses the information processing device 3A.

Further, the acquisition decision unit 384 decides whether or not the acquired conversion information includes conversion information corresponding to identification information of the application being executed. In other words, the conversion information is created and retained for the account of each user and for each application.

[Function of Conversion Information Acquisition Unit]

If it is decided by the acquisition decision unit 384 that conversion information in accordance with an application to be executed by the application execution unit 38B is not retained in the storage 33 and besides conversion information corresponding to the account of the user and in accordance with the application is retained in the server 4A, then the conversion information acquisition unit 385 acquires and retains the pertaining conversion information into the storage 33.

[Function of Display Controlling Unit]

Figure 19:
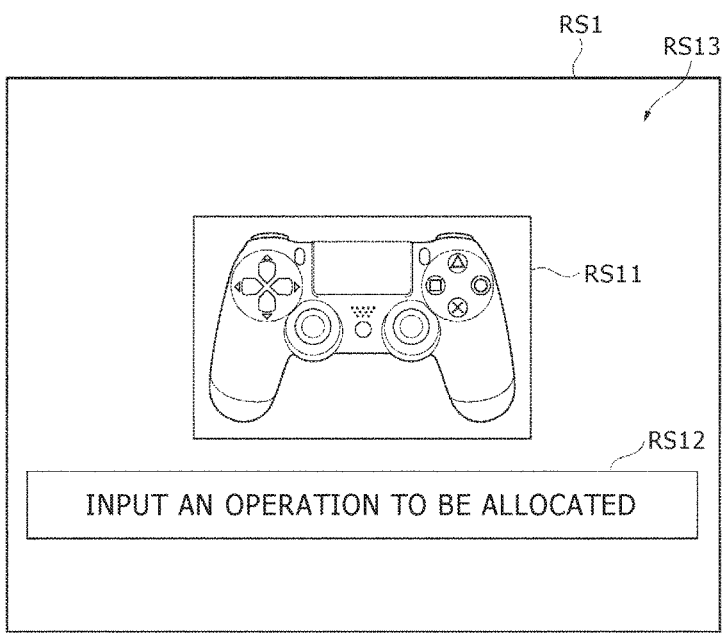
FIG. 19 is a view depicting an example of a pre-conversion operation registration screen image in the embodiment.

FIG. 19 is a view depicting an example of a pre-conversion operation registration screen image RS1.

The display controlling unit 386 controls the rendering unit 35 to render various screen images to be displayed on the display apparatus DP. For example, when a conversion information generation process of generating conversion information is to be executed, the display controlling unit 386 controls the rendering unit 35 to render, for example, the pre-conversion operation registration screen image RS1 depicted in FIG. 6. Besides, when an operation conversion process of converting operation information based on conversion information is to be executed, the display controlling unit 386 controls the rendering unit 35 to render a conversion screen image CS1 or CS2 (refer to FIGS. 21 and 22) hereinafter described. It is to be noted that the conversion screen images CS1 and CS2 are hereinafter described in detail.

The pre-conversion operation registration screen image RS1 is a screen image for registering an inputting operation (pre-conversion operation) of the operation apparatus 2 to be converted and is displayed in an overlapping relationship with an execution screen image of the OS and an application. In the pre-conversion operation registration screen image RS1, a display region RS11 to which a pattern simulating the operation apparatus 2 is set and an explanatory text RS12 of the pre-conversion operation registration screen image RS1 are set, and the region of the pre-conversion operation registration screen image RS1 other than the display region RS11 and the explanatory text RS12 is a transmission region RS13. In particular, the transmission region RS13 is an execution screen image display region in which an execution screen image is displayed, and the screen image RS1 is displayed such that the execution screen image can be observed through the transmission region RS13.

Figure 20:
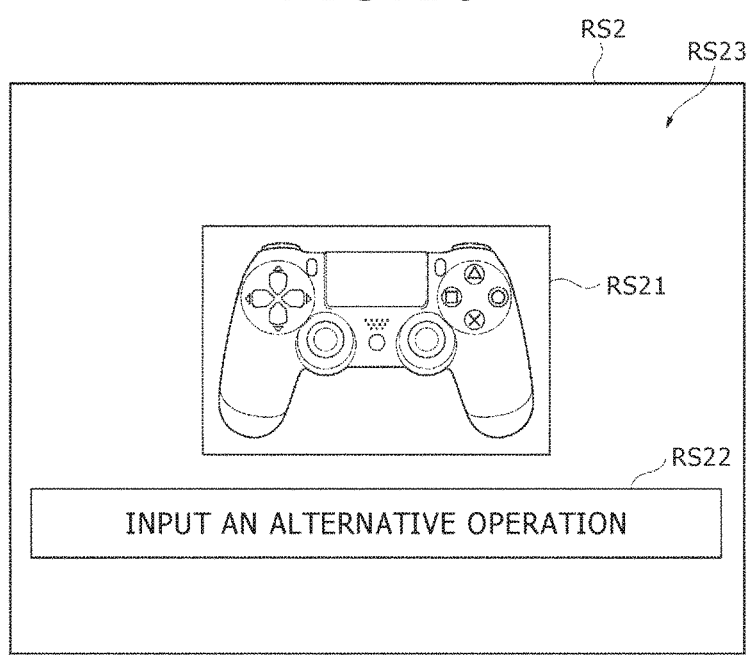
FIG. 20 is a view depicting an example of a post-conversion operation registration screen image in the embodiment.

FIG. 20 is a view depicting an example of a post-conversion operation registration screen image RS2.

If a pre-conversion operation is performed for the operation apparatus 2 when the pre-conversion operation registration screen image RS1 is displayed, then the display controlling unit 386 controls the rendering unit 35 to render the post-conversion operation registration screen image RS2 depicted in FIG. 20.

The post-conversion operation registration screen image RS2 is a screen image for registering an inputting operation (post-conversion operation) into which a pre-conversion operation is converted and is displayed in an overlapping relationship with the execution screen image described hereinabove similarly to the pre-conversion operation registration screen image RS1. In the post-conversion operation registration screen image RS2, a display region RS21 in which a shape of the operation apparatus 2 is set and an explanatory context RS22 of the post-conversion operation registration screen image RS2 similarly as in the screen image RS1. The region of the post-conversion operation registration screen image RS2 other than the display region RS21 and the explanatory context RS22 is a transmission region RS23 similar to the transmission region RS13.

In the screen images RS1 and RS2, though not depicted, markers indicative of operation targets of the pre-conversion operation and the post-conversion operation performed for the operation apparatus 2 are applied to the display regions RS11 and RS21, respectively.

For example, if an input of the button 229L and an operation of the stick 225L are carried out upon when the pre-conversion operation registration screen image RS1 is displayed, then a marker of a round mark is applied to a position in the display region RS11 corresponding to each of the button 229L and the stick 225L.

Further, for example, if an operation of the stick 225R is carried out when the screen image RS2 is displayed, a marker of a round mark is applied to a position of the display region RS21 corresponding to the stick 225R.

It is to be noted that the marker indicative of an operation target of each of a pre-conversion operation and a post-conversion operation is not limited to such a marker as described above but may be some other marker. For example, the operation target may be indicated by a color different from the other part. Further, the display controlling unit 386 may cause images in accordance with inputting operations performed actually for the controller 22 when the pre-conversion operation registration screen image RS1 or RS2 is displayed (namely, a pre-conversion operation and a post-conversion operation) to be displayed in the display regions RS11 and RS21, respectively. For example, if the button 229L is inputted and the stick 225L is tilted when the pre-conversion operation registration screen image RS1 is displayed, the display controlling unit 386 may cause an image in which the button 229L of the controller 22 rendered in the display region RS11 is inputted and the stick 225L is tilted to be displayed.

[Function of Conversion Information Generation Unit]

Referring back to FIG. 18, the conversion information generation unit 387 and the conversion information transmission unit 388 function upon execution of a conversion information generation process of generating the conversion information described hereinabove.

The conversion information generation unit 387 generates conversion information. In particular, the conversion information generation unit 387 acquires operation information acquired by the operation acquisition unit 381 when the screen image RS1 is displayed as pre-conversion operation information in accordance with a pre-conversion operation. Further, the conversion information generation unit 387 acquires operation information acquired by the operation acquisition unit 381 when the screen image RS2 is displayed as operation information in accordance with a post-conversion operation. Then, the conversion information generation unit 387 generates conversion information for converting the pre-conversion operation information into the post-conversion operation information. Thereafter, the conversion information generation unit 387 retains the conversion information in an associated relationship with an account of a user and identification information of an application which performs input conversion based on the conversion information into the storage 33 thereby to register the conversion information. In short, the conversion information is generated for the account of each user and each of pieces of identification information of an application by which a conversion process is to be performed.

It is to be noted that also it is possible to execute a conversion information generation process including display of the screen images RS1 and RS by a plural number of times and generate a plurality of pieces of conversion information each including a pre-conversion operation and a post-conversion operation in an associated relationship with identification information of the application.

[Function of Conversion Information Transmission Unit]

The conversion information transmission unit 388 transmits conversion information generated by the conversion information generation unit 387 to the server 4A such that the conversion information is retained into the server 4A. It is to be noted that the transmitted conversion information is retained in an associated relationship with an account of a user and identification information of an application by the server 4A.

[Function of Operation Conversion Unit]

The operation conversion unit 389 and the operation information outputting unit 390 function when an operation conversion process of converting operation information on the basis of the conversion information described hereinabove is executed.

The operation conversion unit 389 converts pre-conversion operation information acquired by the operation acquisition unit 381 into post-conversion operation information in accordance with a post-conversion operation which is an inputting operation different from the pre-conversion operation indicated by the pre-conversion operation information on the basis of conversion information retained in the storage 33. In particular, where conversion information corresponding to the account of the present user and associated with identification information of an application executed by the application execution unit 38B is retained, if pre-conversion operation information included in the conversion information is acquired, then the operation conversion unit 389 converts the pre-conversion operation information into post-conversion operation information on the basis of the conversion information.

For example, if the conversion information includes pre-conversion operation information indicative of an input of the button 229L and an operation of the stick 225L and further includes post-conversion operation indicative of an operation of the stick 225R, if the pre-conversion operation information is acquired, then the operation conversion unit 389 generates post-conversion operation information indicative of an operation of the stick 225R on the basis of the conversion information.

Further, for example, when the conversion information includes operation information in accordance with an inputting operation of one of the buttons 223 as pre-conversion operation information and includes operation information in accordance with an inputting operation of a different one of the buttons 223 as post-conversion operation information, if operation information in accordance with the pre-conversion operation is acquired, then the operation conversion unit 389 generates the post-conversion operation information on the basis of the conversion information.

It is to be noted that, when conversion information corresponding to the account of the user who uses the information processing device 3A and identification information of an application being executed are not retained or when an operation different from the pre-conversion operation is performed although the conversion information is retained, the operation conversion unit 389 does not convert the acquired operation information.

The operation information outputting unit 390 outputs operation information processed by the operation conversion unit 389 (post-conversion operation information and operation information which has not been converted) to the application execution unit 38B. Consequently, the application execution unit 38B executes a process in accordance with the operation information in an application being executed.

[Configuration of Conversion Screen Image]

Figure 21:
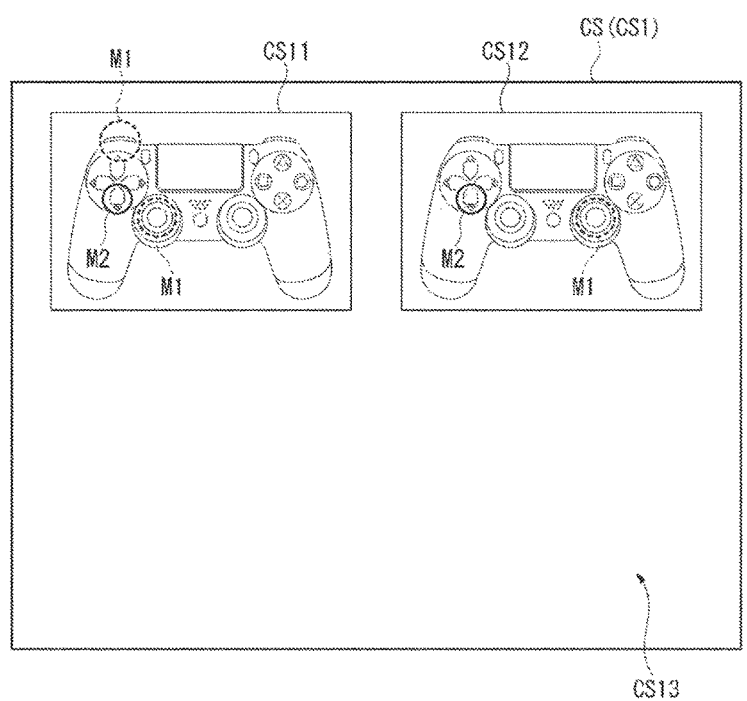
FIG. 21 is a view depicting an example of a conversion screen image in the embodiment.

FIG. 21 is a view depicting a conversion screen image CS1 which is an example of a conversion screen image CS.

When the operation conversion process is being executed by the operation conversion unit 389 and the operation information outputting unit 390, the display controlling unit 386 controls the rendering unit 35 to render, for example, a conversion screen image CS1 depicted in FIG. 21 and controls the display apparatus DP to display the conversion screen image CS1.

The conversion screen image CS1 is a screen image displayed in an overlapping relationship with an execution screen image of the OS and an application similarly to the screen images RS1 and RS2 and is a screen image which indicates contents of an inputting operation to the operation apparatus 2 (controller 22) and contents of a result of processing by the operation conversion unit 389.

In particular, in the conversion screen image CS1, a pre-conversion operation display region CS11 and a post-conversion operation display region CS12 in which a pattern simulating the controller 22 is set are set. The region of the conversion screen image CS1 other than the display regions CS11 and CS12 is a transmission region CS13 similar to the transmission regions RS13 and RS23. In other words, the transmission region CS13 corresponds to an execution screen image displaying region in which the execution screen image is displayed.

Out of the display regions, the pre-conversion operation display region CS11 is a region in which contents of an operation indicated by acquired operation information are displayed. For example, if the contents of an operation indicated by the operation information are an input of a lower side portion of the direction key 222, an input of the button 229L or an operation of the stick 225L, a marker indicative of an operation target indicated by the operation information is set to a lower side portion of the direction key 222, the button 229L or the stick 225L in the display region CS11 as depicted in FIG. 21.

Here, the display controlling unit 386 causes a conversion screen image CS1 to be rendered which indicates, from among operation contents indicated by the acquired operation information, an operation target corresponding to the pre-conversion operation included in the retained conversion information and an operation target which is not included in the conversion information by different marks.

In particular, if the pertaining conversion information includes, as pre-conversion operation information, operation information in accordance with an input of the button 229L and an operation of the stick 225L but does not include, as pre-conversion operation information, operation information in accordance with an input of the lower side portion of the direction key 222, then the display controlling unit 386 causes a conversion screen image CS1 to be rendered in which the markers set to the positions of the button 229L and the stick 225L and the marker set to the lower side portion of the direction key 222 in the display region CS11 are different from each other.

It is to be noted that, in the present embodiment, the operation target corresponding to the pre-conversion operation is indicated by a marker M1 which is a broken line round mark and the operation target which does not correspond to the pre-conversion operation is indicated by a marker M2 which is a solid line round mark as depicted in FIG. 21. However, the markers are not limited to them, and the operation targets may be distinguished from each other by other markers or displays.

Meanwhile, the post-conversion operation display region CS12 is a region in which operation contents indicated by operation information processed by the operation conversion unit 389 are displayed. In particular, the display region CS12 is a region in which an operation target indicted by the operation information converted by the operation conversion unit 389 among the acquired operation information and an operation target indicated by the operation information which has not been converted are indicated by different markers.

For example, if operation information in accordance with an input of a lower side portion of the direction key 222, an input of the button 229L and an operation of the stick 225L is acquired as described hereinabove, then the operation information indicating the input of the button 229L and the operation of the stick 225L is converted into operation information in accordance with an operation of the stick 225R by the operation conversion unit 389, a marker M1 same as the marker M1 set to the positions of the button 229L and the stick 225L in the pre-conversion operation display region CS11 is set at the position of the stick 225R in the display region CS12. Thereupon, the marker M1 is not set at the position of the button 229L and the stick 225L in the display region CS12.

Meanwhile, since the operation information indicative of the input of the lower side portion of the direction key 222 is not converted by the operation conversion unit 389, a marker M2 same as the marker M2 set at the lower side portion in the operation display region CS11 is set at the lower side portion of the direction key 222 in the display region CS12.

The positions of the markers in the display regions CS11 and CS12 are successively updated every time new operation information is acquired.

Since such a conversion screen image CS1 as described above is displayed, the user can readily confirm a pre-conversion operation and a post-conversion operation as well as an input operation not converted.

It is to be noted that, although the pre-conversion operation display region CS11 is positioned on the left side with respect to the post-conversion operation display region CS12, the display region CS11 may be positioned on the upper side. In particular, if the display regions CS11 and CS12 can be distinguished from each other, then the layout of the display regions CS11 and CS12 in the conversion screen image CS1 can be changed suitably.

Further, as described hereinabove in connection with the screen images RS1 and RS2, the display controlling unit 386 may control such that an image in accordance with an inputting operation (pre-conversion operation) performed actually for the controller 22 when the conversion screen image CS1 is displayed is displayed in the pre-conversion operation display region CS11 and an image in accordance with a post-conversion operation is displayed in the post-conversion operation display region CS12. For example, when the conversion screen image CS1 is displayed, if an input of the button 229L and tilting of the stick 225L are carried out as pre-conversion operations and when the pre-conversion operation is converted as a post-conversion operation into tilting of the stick 225R, then the display controlling unit 386 may control such that an image in which the button 229L of the controller 22 rendered in the pre-conversion operation display region CS11 is inputted and besides the stick 225L is tilted is displayed and another image in which the stick 225R of the controller 22 rendered in the post-conversion operation display region CS12 is tilted is displayed.

Further, when conversion of an operation amount (operation sensitivity) is performed, the converted operation amount may be displayed as a numerical value such as a ratio. For example, when a pre-conversion operation of tilting the stick 225L most in the rightward direction is converted into a post-conversion operation of tilting the stick 225R in the leftward direction by a tilting amount equal to one half the tilting amount when the stick 225R is tilted most, if the pre-conversion operation is carried out, then the display controlling unit 386 may control such that the ratio of "50%" which is an input amount of the stick 225R is displayed in accordance with the post-conversion operation display region CS12.

Figure 22:
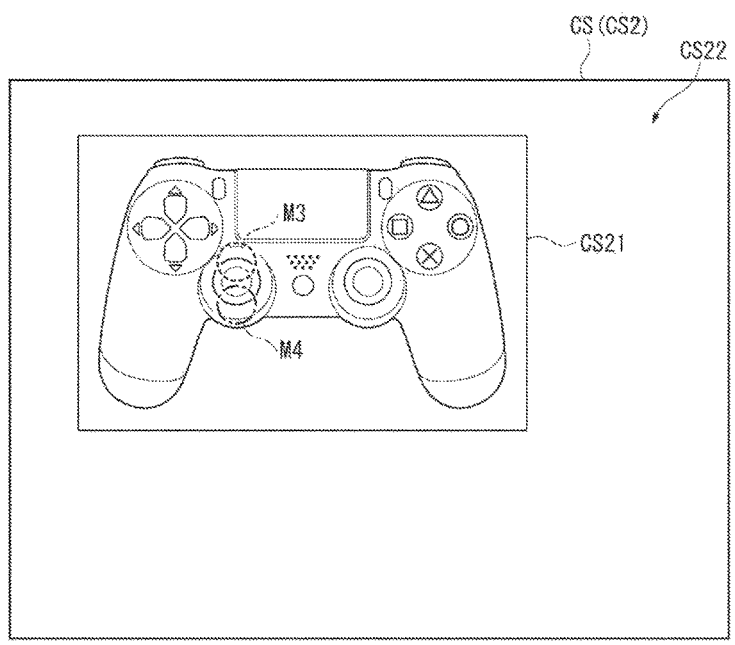
FIG. 22 is a view depicting another example of the conversion screen image in the embodiment.

FIG. 22 is a view depicting a conversion screen image CS2 which is another example of the conversion screen image CS.

It is to be noted that the form of the conversion screen image CS indicative of a conversion state of operation information (in other words, a conversion state of an inputting operation) is not limited to that of the conversion screen image CS1. For example, the display controlling unit 386 may render the conversion screen image CS2 depicted in FIG. 22 and cause the conversion screen image CS2 to be displayed.

The conversion screen image CS2 is a screen image displayed in an overlapping relationship with an execution screen image of the OS and an application similarly to the conversion screen image CS1. In the conversion screen image CS2, an operation displaying region CS21 in which a pattern simulating the operation apparatus 2 (controller 22) is set is set, and the region of the conversion screen image CS2 other than the operation displaying region CS21 is a transmission region CS22 (corresponding to the execution screen image displaying region) similarly to the transmission region CS13.

Out of the display regions, the operation displaying region CS21 corresponds to a pre-conversion operation display region and a post-conversion operation display region and a region in which operation contents indicated by acquired operation information and operation contents indicted by operation information processed by the operation conversion unit 389 are displayed. In particular, the operation displaying region CS21 is a region in which operation contents indicated by the acquired operation information (same as the operation contents indicated by the operation information which has not been converted) and the operation contents indicated by the operation information which has been converted by the operation conversion unit 389 are indicated by different markers.

For example, if the operation contents indicated by the acquired operation information is tilting of the stick 225L to the upward direction and the operation information is converted into operation information indicative of tilting of the stick 225L in the downward direction, then the display controlling unit 386 controls such that a conversion screen image CS2 in which a marker M3 in the form of a broken line round mark is set to an upper side position of the stick 225L in the operation displaying region CS21 and a marker M4 in the form of a round mark of an alternate long and short dash line is set to an lower side position of the stick 225L is rendered and displayed as depicted in FIG. 22.

It is to be noted that, at a position of an operation target indicated by the operation information which has not be converted by the operation conversion unit 389, a different marker (for example, a marker of a solid line round mark) may be set.

Further, similarly as in the description of the conversion screen image CS1, images in accordance with a pre-conversion operation and a post-conversion operation may be displayed in the operation displaying region CS21. Thereupon, the pre-conversion operation and the post-conversion operation may be indicated by different colors or may be displayed at timings displaced from each other. Further, where conversion of an operation amount (operation sensitivity) is performed, the converted operation amount may be displayed in the form of a numerical value such as a ratio similarly as in the description of the conversion screen image CS1.

Also when such a conversion screen image CS2 as described above is displayed, the user can recognize the operation contents of the pre-conversion operation and the post-conversion operation.

[Conversion Information Generation Process]

Figure 23:
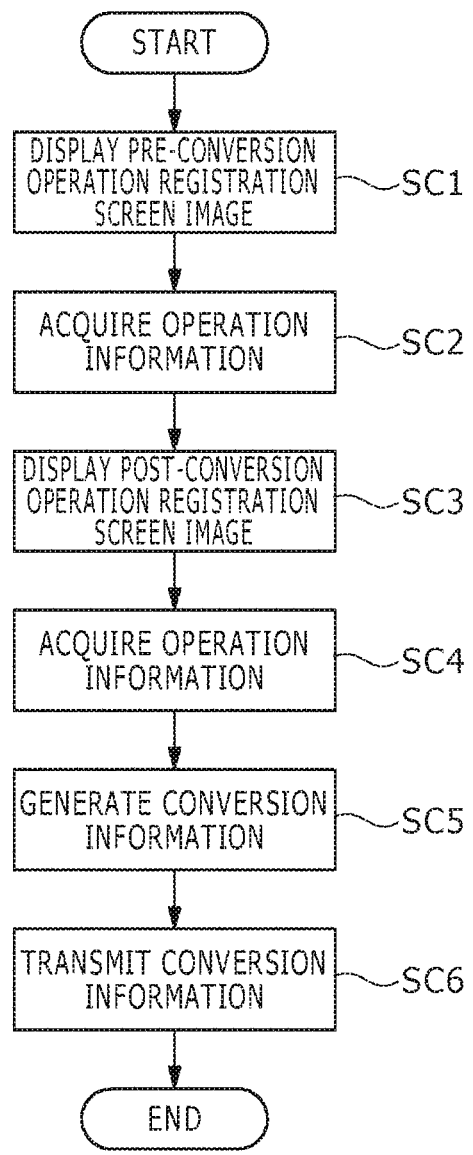
FIG. 23 is a flow chart illustrating a conversion information generation process in the embodiment.

FIG. 23 is a flow chart depicting a conversion information generation process.

In the case where, in a state in which a setting operation for converting an inputting operation (operation information in accordance with the inputting operation) when a particular application is executed by the user is performed, it is decided that the pertaining conversion information is not retained in the storage 33 or an inputting operation for generating conversion information newly is performed by the user, the control unit 38 reads out the conversion information generation program incorporated in the OS and executes the conversion information generation process described below.

In this conversion information generation process, the display controlling unit 386 first controls such that a pre-conversion operation registration screen image RS1 described hereinabove is rendered and displayed as depicted in FIG. 23 (step SC1).

Then, the operation acquisition unit 381 acquires operation information received upon displaying of the pre-conversion operation registration screen image RS1 as pre-conversion operation information (step SC2).

Then, the display controlling unit 386 controls such that a post-conversion operation registration screen image RS2 is rendered and displayed (step SC3).

Then, the operation acquisition unit 381 acquires operation information received upon displaying of the screen image R52 as post-conversion operation information (step SC4).

Thereafter, the conversion information generation unit 387 generates conversion information for converting pre-conversion operation information into post-conversion operation information and retains the conversion information in an associated relationship with an account of a user and identification information of a target application into the storage 33 (step SC5).

Further, the conversion information transmission unit 388 transmits the generated conversion information to the server 4A such that the server 4A retains the conversion information in an associated relationship with the account of the user and the identification information of the target application (step SC6).

The conversion information generation process is ended therewith.

[Operation Conversion Process]

Figure 24:
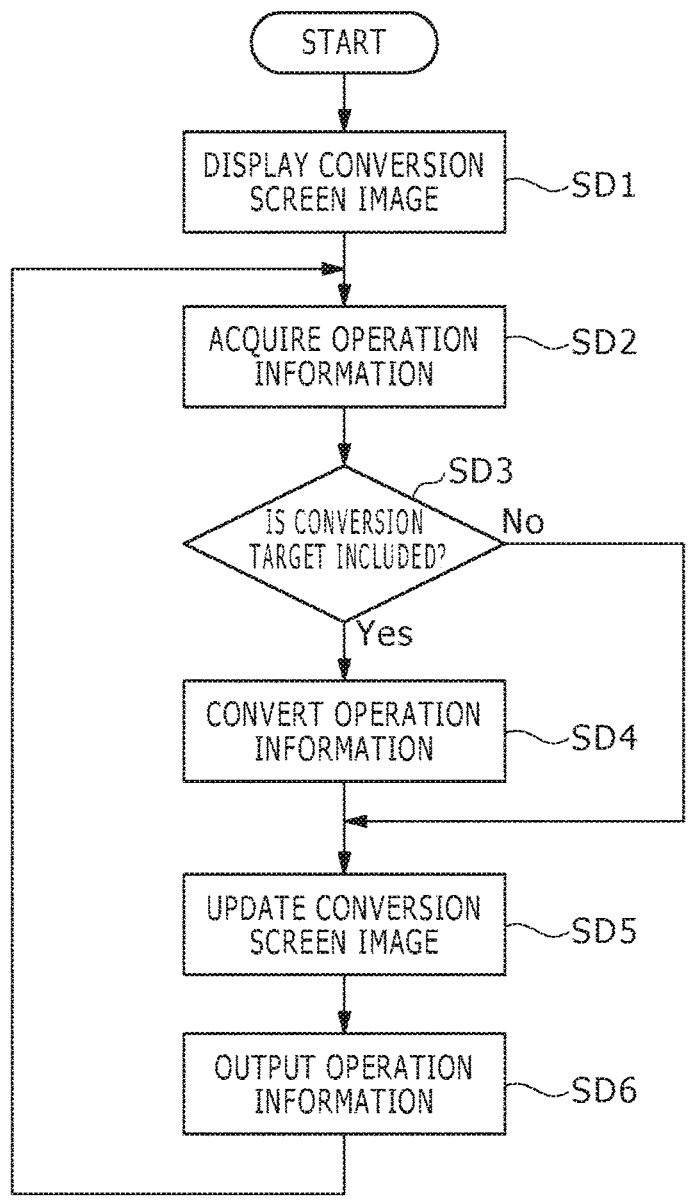
FIG. 24 is a flow chart depicting an operation conversion process in the embodiment.

FIG. 24 is a flow chart depicting an operation conversion process.

The control unit 38 reads out the operation conversion program incorporated in the OS and executes an operation conversion process described below if, in a state in which a setting operation for converting an inputting operation (operation information in accordance with the inputting operation) is performed upon execution of a particular application, the particular application is to be executed by the application execution unit 38B. The operation conversion program includes a control program relating to the operation, and the operation conversion process includes a control method relating to the operation.

In the operation conversion process, the display controlling unit 386 first controls such that a conversion screen image CS (conversion screen image CS1 or CS2) is rendered and displayed as depicted in FIG. 11 (step SD1).

Then, the operation acquisition unit 381 acquires operation information received from an operation apparatus 2 (controller 22) (step SD2).

Then, the operation conversion unit 389 decides whether or not operation information of a conversion target (pre-conversion operation information) is included in the acquired operation information (step SD3). Thereupon, if the conversion information corresponding to the account of the user at present and the application being executed are not retained in the storage 33, then the operation conversion unit 389 decides that the acquired operation information is not a conversion target. Further, even in the case where the corresponding conversion information is retained, if it is decided that the acquired operation information is not included as pre-conversion operation in the conversion information, the operation conversion unit 389 decides that the acquired operation information is not a conversion target.

If it is decided by the decision process at step SD3 that the operation information of a conversion target is not included, then the control unit 38 advances its processing to step SD5. On the other hand, if it is decided by the decision process at step SD3 that the operation information of a conversion target is included, then the operation conversion unit 389 converts the operation information of the conversion target into post-conversion operation on the basis of the pertaining conversion information (step SD4). Thereafter, the control unit 38 advances its processing to step SD5.

At step SD5, the display controlling unit 386 updates the conversion screen image CS on the basis of the acquired operation information and the operation information processed by the operation conversion unit 389 (including the operation information which has not been converted and the post-conversion operation) (step SD5).

Further, the operation information outputting unit 390 outputs the operation information processed by the operation conversion unit 389 to the application execution unit 38B such that the application execution unit 38B executes a process in accordance with the operation information (step SD6).

After step SD6, the control unit 38 controls the process to return to the step SD2 and repeatedly execute the operation conversion process until the user ends the operation conversion process or the application being executed is terminated.

[Configuration of Server]

Figure 25:
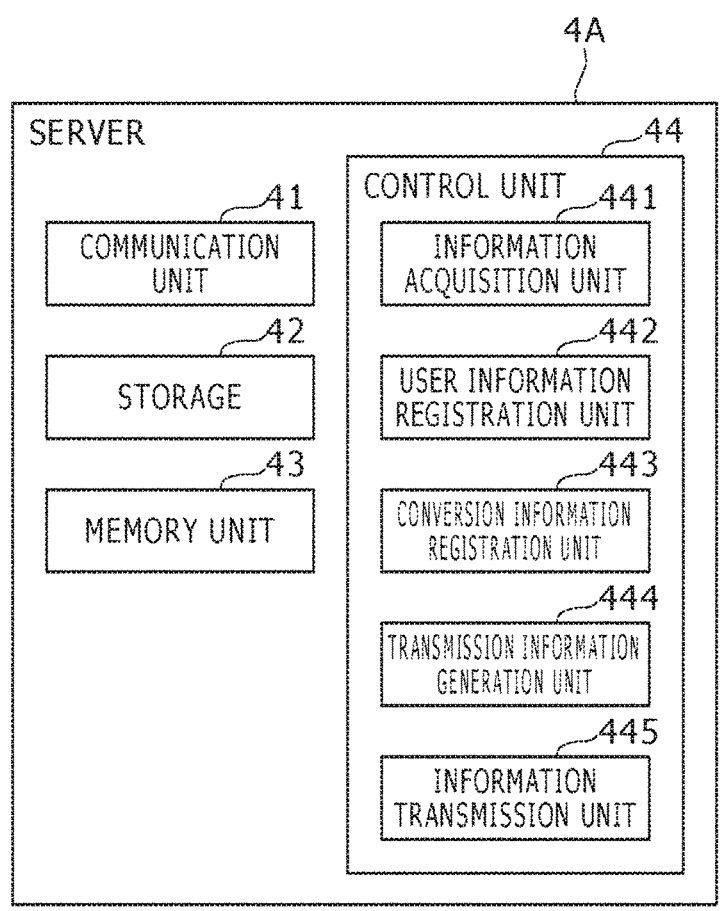
FIG. 25 is a block diagram depicting a configuration of a server in the embodiment.

FIG. 25 is a block diagram depicting a configuration of the server 4A.

Figure 26:
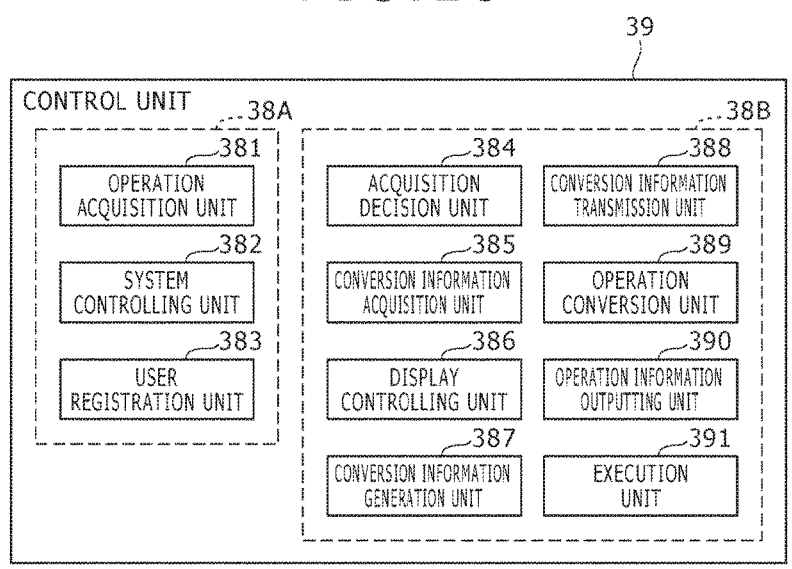
FIG. 26 is a block diagram depicting a modification to the control unit of the information processing device in the embodiment.

The server 4A communicates with the information processing device 3A through the network N to provide various programs and data of various contents and so forth similarly to the server 4. Such a server 4A as just described includes a communication unit 41, a storage 42, a memory unit 43 and a control unit 44 as depicted in FIG. 26.

The communication unit 41 communicates with an external apparatus such as the information processing device 3A through the network N under the control of the control unit 44 similarly to the communication unit 32. Further, the communication unit 41 outputs, for example, information received from the information processing device 3A to the control unit 44 and further transmits information inputted thereto from the control unit 44 so as to be transmitted to the information processing device 3A to the pertaining information processing device 3A.

The storage 42 has a configuration similar to that of the storage 33, and stores programs necessary for operation of the server 4A such as the OS and further stores data of various contents of applications, audios, videos and so forth. Further, the storage 42 stores, for an account of each user, in addition to user information including a type of operation devices owned by the user and a type and so forth of an operation device connected at present to the information processing device 3A, a database for retaining identification information of applications and conversion information in an associated relationship with each other.

The memory unit 43 is configured from a RAM or the like and provides a working area for the control unit 44.

The control unit 44 is configured by including a CPU. The CPU executes a program such as the OS to autonomously control the server 4A and executes a process in accordance with information received from an external apparatus by the communication unit 41. Such a control unit 44 as just described has, as functional units, an information acquisition unit 441, a user information registration unit 442, a conversion information registration unit 443, a transmission information generation unit 444 and an information transmission unit 445 which are implemented by the OS processing the program.

The information acquisition unit 441 acquires information received from an external apparatus by the communication unit 41.

The user information registration unit 442 registers, when the user information described above is acquired from the information processing device 3A, the user information into the database of the storage 42.

The conversion information registration unit 443 registers, when information including conversion information is acquired from the information processing device 3A, the conversion information into the database of the storage 42 in an associated relationship with the account of the user and the identification information of the application included in the acquired information.

The transmission information generation unit 444 generates information to be transmitted to an external apparatus such as the information processing device 3A. For example, if requesting information for requesting for transmission of conversion information is acquired from the information processing device 3A, then the transmission information generation unit 444 acquires conversion information in accordance with the account of the user included in the requesting information from the storage 42 and generates transmission information including the conversion information. Thereupon, if the identification information of the application is included in the requesting information, then the transmission information generation unit 444 may generate transmission information including only the conversion information in accordance with the account of the user and the identification information.

The information transmission unit 445 transmits transmission information generated by the transmission information generation unit 444 to a pertaining apparatus such as the information processing device 3 through the communication unit 41. For example, when the requesting information which requests for the conversion information is acquired, the information transmission unit 445 transmits transmission information including corresponding conversion information to the information processing device 3A from which the requesting information has been transmitted.

Effects of the Second Embodiment

With the information processing system 1A according to the present embodiment described above, the following effects are anticipated.

If operation information in accordance with an inputting operation for an operation apparatus 2 (controller 22) is included as pre-conversion operation information in conversion information, then the operation information is converted into corresponding post-conversion operation information by the operation conversion unit 389. With this, for example, an operation for the stick 225R disposed at a right side portion of the controller 22 can be carried out alternatively by an input of the button 229L disposed on the left side and an operation for the stick 225L, as described above. In this case, an inputting operation corresponding to an operation for the stick 225R can be carried out only by the left hand by which the controller 22 is grasped. Accordingly, it is possible to facilitate carrying out of an operation for the information processing device 3A by the operation apparatus 2.

Further, contents of a post-conversion operation are indicated by a conversion screen image CS (CS1 or CS2). With this, by confirming the conversion screen image CS, it can be recognized in what manner a pre-conversion operation performed actually has been converted. Accordingly, it is possible to further facilitate operation of the information processing device 3A by the operation apparatus 2.

The conversion screen image CS1 includes, in addition to a pre-conversion operation display region CS11 and a post-conversion operation display region CS12 in which a pre-conversion operation and a post-conversion operation are indicated, respectively, a transmission region CS13 which is an execution screen image displaying region in which an execution screen image can be observed. Further, the conversion screen image CS2 includes, in addition to an operation displaying region CS21 in which a pre-conversion operation and a post-conversion operation are indicated, a transmission region CS22 similar to the transmission region CS13. With this, by observing the conversion screen image CS displayed in an overlapping relationship with an execution screen image of the OS and an application, a situation and a result of a process in accordance with the post-conversion operation can be observed in addition to contents of the pre-conversion operation and the post-conversion operation. Accordingly, since also the execution screen image can be observed while contents of the pre-conversion operation and the post-conversion operation are confirmed, it is possible to further facilitate an operation of the information processing device 3A by the operation apparatus 2.

Here, a user of the information processing device 3A tends to emphasize, as the user becomes more familiar with an operation by an operation apparatus 2, a situation and a result of a process obtained as a result of an inputting operation rather than contents of a pre-conversion operation and a post-conversion operation.

In contrast, in the conversion screen image CS2, a pre-conversion operation and a post-conversion operation are indicated in the operation displaying region CS21. With this, it is possible to decrease the ratio of the area occupied by the operation displaying region CS21 which indicates a pre-conversion operation and a post-conversion operation in the display screen image in comparison with the conversion screen image CS1. Accordingly, since the ratio of the area occupied by the transmission region CS22 which is an execution screen image displaying region can be increased, it is possible to facilitate recognition of a situation and a result of a process obtained as a result of an inputting operation for the operation apparatus 2.

The display controlling unit 386 causes a pre-conversion operation registration screen image RS1 and a post-conversion operation registration screen image RS2 to be displayed. Then, the conversion information generation unit 387 acquires operation information acquired upon displaying of the pre-conversion operation registration screen image RS1 as pre-conversion operation information and acquires operation information acquired upon display of the post-conversion operation registration screen image RS2 as post-conversion operation information. In other words, a pre-conversion operation and a post-conversion operation are actually carried out by the user using the controller 22, and pre-conversion operation information and post-conversion operation information are acquired in response to a pre-conversion operation and a post-conversion operation actually performed by the user. Then, since the conversion information generation unit 387 generates conversion information on the basis of the pre-conversion operation information and the post-conversion operation information, the conversion information generation unit 387 can carry out a conversion process by the operation conversion unit 389 with certainty and appropriately.

Further, since conversion information is generated on the basis of pre-conversion operation information and post-conversion operation information acquired in accordance with a pre-conversion operation and a post-conversion operation performed actually and operation information is converted in accordance with the conversion information, contents of a process to be executed in response to an inputting operation for an operation apparatus 2 (in other words, an operation method of the information processing device 3A using an operation apparatus 2) can be customized in accordance with a liking of the user. Accordingly, it is possible to further facilitate operation of the information processing device 3A.

Since the conversion information acquisition unit 385 can acquire conversion information from the server 4A, in a case in which a new information processing device 3A or a different information processing device 3A is used, in another case in which conversion information retained in the information processing device 3A is deleted (including a case in which the OS is re-installed into the information processing device 3A) or in a like case, there is no necessity to execute a generation process of conversion information (including a displaying process of the screen images RS1 and RS2) by the conversion information generation unit 387 again. Accordingly, since the conversion process can be executed using the acquired conversion information, the convenience of the information processing system 1A can be improved.

Since the OS execution unit 38A which executes the OS as a control program includes an operation acquisition unit 381, a display controlling unit 386 and an operation conversion unit 389, the operation conversion process described above is performed by the OS execution unit 38A. Further, the application execution unit 38B obtains a result of the process by the OS execution unit 38A and executes a predetermined application. With this, there is no necessity to incorporate a program for executing the operation conversion process for each application. Accordingly, a development step of an application can be simplified.

Modification to Second Embodiment

In the information processing device 3A described hereinabove, the OS execution unit 38A includes the functional units 384 to 390, and the application execution unit 38B executes a process in accordance with operation information inputted from the operation information outputting unit 390. However, the present invention is not limited to this.

FIG. 26 is a block diagram depicting a control unit 39 which is a modification to the control unit 38.

For example, in the control unit 39, as depicted in FIG. 26, the OS execution unit 38A includes an operation acquisition unit 381, a system controlling unit 382 and a user registration unit 383, and the application execution unit 38B includes functional units 384 to 390 which execute the conversion information generation process and the operation conversion process described hereinabove, and an execution unit 391 which executes an application designated by the system controlling unit 382 and executes a process in accordance with operation information inputted from the operation information outputting unit 390. Also with an information processing device which includes such a control unit 39 as described above and the transmission-reception unit 31, communication unit 32, storage 33, memory unit 34 and rendering unit 35, effects similar to those of the information processing device 3A can be anticipated. In other words, a program for executing the operation conversion process described above may be included in an application.

Third Embodiment

Now, a third embodiment is described.

In an information processing system according to the present embodiment, a server includes functions similar to those of the server 4A described hereinabove and distributes a list screen image to which information relating to applications which can be provided to an information processing device is set to the information processing device. It is to be noted that, in the following description, like or substantially like elements to those described already are denoted by like reference characters and description of them is omitted herein.

Figure 27:
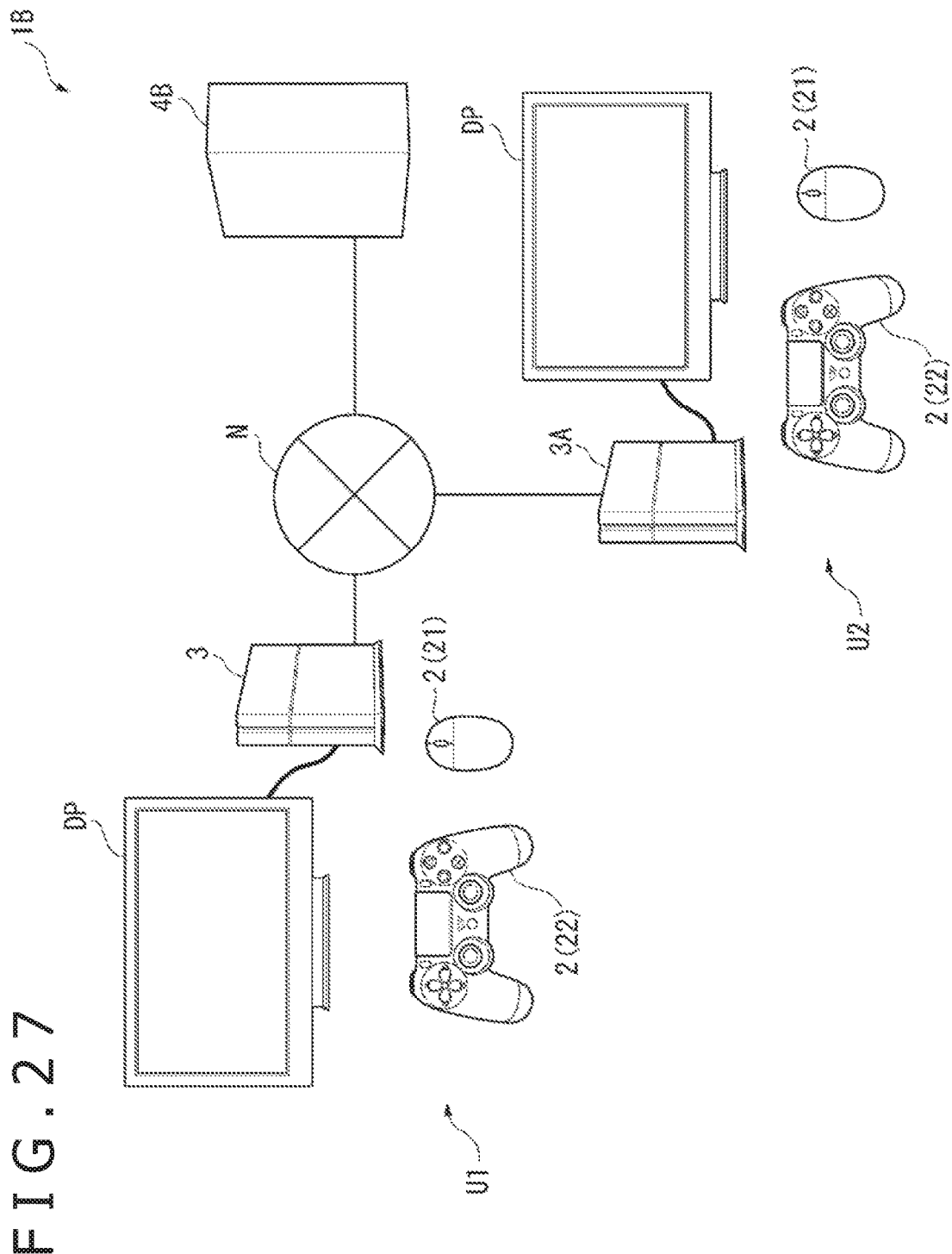
FIG. 27 is a schematic view depicting a configuration of an information processing system according to a third embodiment.

FIG. 27 is a schematic view depicting a configuration of an information processing system 1B according to the present embodiment.

The information processing system 1B according to the present embodiment includes, as depicted in FIG. 17, a unit U1 including operation apparatus 2, an information processing device 3 and a display apparatus DP, another unit U2 including operation apparatus 2, an information processing device 3A and another display apparatus DP, and a server 4B connected for communication to the information processing devices 3 and 3A through a network N, and has functions similar to those of the information processing systems 1 and 1A.

Out of the components mentioned, the server 4B has a configuration and functions of the servers 4 and 4A. For example, the server 4B communicates with the information processing devices 3 and 3A through the network N to transmit and receive data of various programs, various contents and so forth. Further, the server 4B has a function for transmitting, when requesting information for requesting for a list of contents which can be provided from the server 4B is received from the information processing device 3 or 3A, a list screen image suitable for the information processing device 3 or 3A from which the requesting information is received. Thereupon, the server 4B transmits the list screen image in a format in which the list screen image can be browsed by a Web browser. In other words, the server 4B functions also as a Web server. The server 4B having such a configuration as just described includes a communication unit 41, a storage 42, a memory unit 43 and a control unit 44.

Thus, if requesting information for requesting for a list of content which can be provided from the server 4B is acquired from the information processing device 3 or 3A through the communication unit 41, then the transmission information generation unit 444 of the server 4B generates a list screen image LS suitable for the pertaining information processing device 3 or 3A and generates transmission information including the list screen image LS. It is to be noted that the list screen image LS is hereinafter described in detail.

The information transmission unit 445 transmits transmission information generated by the transmission information generation unit 444 to an external apparatus such as the pertaining information processing device 3 or 3A through the communication unit 41. For example, if requesting information for requesting for a list of contents is acquired, then the information transmission unit 445 transmits transmission information including the list screen image LS generated by the transmission information generation unit 444 to the information processing device 3 or 3A from which the requesting information is received. Then, the information processing device 3 or 3A receives and processes the transmission information to display the list screen image LS.

[Configuration of List Screen Image]

Figure 28:
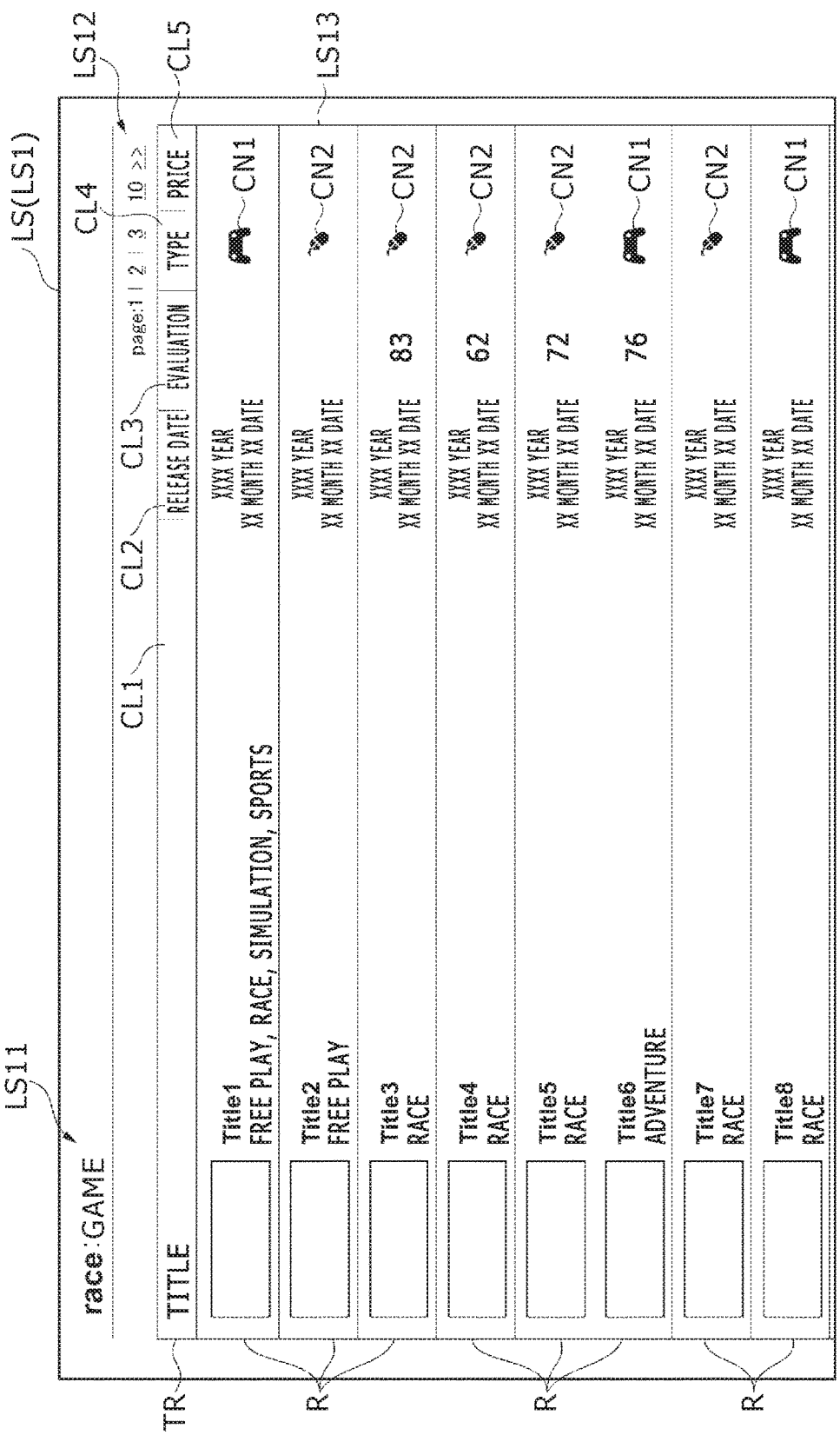
FIG. 28 is a view depicting an example of a list screen image in the embodiment.

FIG. 28 is a view depicting a list screen image LS1 which is one example of a list screen image LS of an application which is a piece of contents which can be provided to the information processing devices 3 and 3A.

The transmission information generation unit 444 generates, for example, such a list screen image LS1 as depicted in FIG. 28.

In the list screen image LS1, a genre displaying region LS11 for indicating a genre of an application, a page displaying region LS12 for displaying a page number and a table LS13 are set.

The table LS13 has a plurality of rows R including a title row TR and five columns CL1 to CL5. In the title row TR, "title," "release date," "evaluation," "type" and "price" are described corresponding to the columns CL1 to CL5, respectively. Further, in the columns CL1 to CL5 in each row R, title information, a release date, an evaluation point, a type of an operation apparatus which can be utilized and a price of an application.

In particular, in the columns CL1 denoted as "title," a title name and logo or tag information is set as the title information of the pertaining application. It is to be noted that, in the present embodiment, if title information in any row R is selected, then a screen image including a detailed description of the pertaining application or a screen image indicating a key assignment (screen image indicating what function is assigned to each button) is displayed.

Further, the column CL4 denoted as "type" is a column in which a type of an operation apparatus which can be utilized in an application set to each row is indicated by an icon. For example, an icon CN1 which simulates the controller indicates that the controller can be utilized for the pertaining application. Further, another icon CN2 which simulates a mouse which is a pointing device indicates that a mouse can be utilized for the pertaining application.

From among the columns CL1 to CL5, information indicated in the columns CL1 to CL3 and CL5 can be sorted in an ascending order or in a descending order. For example, though not depicted, if the column CL5 is selected in the title row TR, then a context menu including selection items denoted as "ascending order" and "descending order" is displayed. If one of the selection items is selected, then contents of the table LS13 are sorted with the selected contents.

Figure 29:
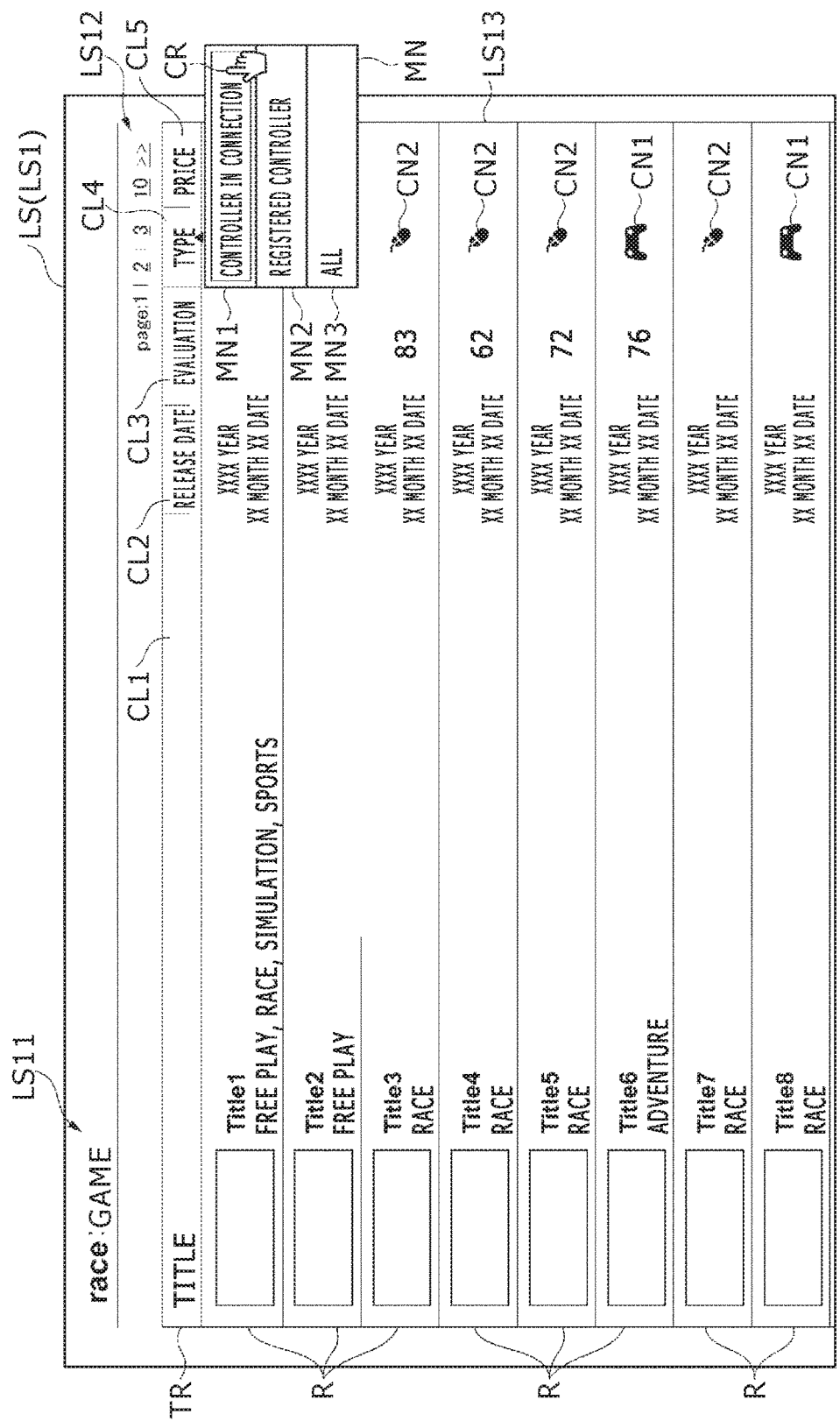
FIG. 29 is a view depicting an example of a list screen image in which a menu is displayed in the embodiment.

FIG. 29 is a view depicting a list screen image LS1 in which a context menu MN in accordance with selection of the column CL4 is displayed. It is to be noted that, in FIG. 29, a list screen image LS1 in which, in a selection item MN1 from among selection items MN1 to MN3 included in the context menu MN, a cursor CR is set is depicted.

Further, if the column CL4 is selected in the title row TR, then the context menu MN including the selection items MN1 to MN3 is displayed as depicted in FIG. 29.

If, among the selection items MN1 to MN3, the selection item MN1 denoted as "controller in connection" is selected by the cursor CR which can be operated by a user, then a list screen image LS1 in which only information of applications in which an operation apparatus connected at present to the pertaining one of the information processing devices 3 and 3A can be utilized is set in the row R of the table LS13 is displayed. For example, if an operation apparatus 2 which is the controller is connected to the information processing device 3, then a list screen image LS1 which includes only a row R in which an icon CN1 which simulates the controller is set is acquired and displayed by the information processing device 3. In particular, if the selection item MN1 is selected, then a list screen image LS1 in which only information of applications in which the operation apparatus 2 connected to the information processing device 3 at present can be utilized is filtered (extracted) is displayed.

Further, though not depicted, if the selection item MN2 denoted as "registered controller" is selected by the cursor CR, then a list screen image LS1 in which only information of applications in which an operation apparatus set as being owned by the user in the user information can be utilized is set in a row of the table LS13 is displayed. For example, in the case where a controller and a mouse are set as operation apparatus owned by the user to the user information, a list screen image LS1 in which only a row R to which at least one of the icons CN1 and CN2 is set is included is displayed. In particular, if the selection item MN2 is selected, then a list screen image LS1 in which only information of applications in which the operation apparatus 2 registered in advance can be utilized is filtered (extracted) is displayed.

It is to be noted that, though not depicted, if a selection item MN3 denoted as "all" is selected by the cursor CR, then the selection state of the selection item MN1 or MN2 is cancelled, and a list screen image LS1 in which all of applications of a genre displayed in the genre displaying region LS11 are set in the row R is displayed.

It is to be noted that it is described above that, if the selection item MN1 or MN2 is selected, then only information of applications which satisfy the condition described hereinabove is filtered. However, a list screen image LS1 after sorting in an ascending order or in a descending order is performed for information of the applications may be displayed. Further, filtering and sorting may be executed in combination. For example, such a configuration that, after filtering is performed such that information of the applications which satisfy the condition described hereinabove is displayed, the information can be sorted in accordance with the title or the like of the applications.

Such filtering and sorting of the table LS13 may be performed by the server 4 referring to the user information or may be performed by the information processing device 3 or 3A which receives transmission information including the list screen image LS.

FIG. 30 is a view depicting a list screen image LS1 when a plurality of icons are set in the column CL4 in one row R in which information of an application is set.

It is to be noted that, depending upon an application, it is sometimes possible to utilize a plurality of kinds of operation apparatus 2. In such a case as just described, the transmission information generation unit 444 sets icons which individually simulate the utilizable operation apparatuses 2. For example, since applications indicated in the rows R4, R7 and R8 of the list screen image LS1 depicted in FIG. 15 individually allow utilization of the controller 22 and the mouse 21, the icon CN1 simulating the controller 22 and the icon CN2 simulating the mouse 21 are set in the column CL4 in the rows R4, R7 and R8.

It is to be noted that the maximum value of the number of rows R in the list screen images LS1 depicted in FIGS. 28 to 30 is eight, and if the number of pertaining applications exceeds the maximum value, then page numbers of the list screen image LS1 are displayed in the page displaying region LS12. Links are set to the page numbers such that, if one of the links is selected, then the pertaining page can be displayed. However, the maximum value is not limited to eight but may be a different number, and a list screen image LS1 in which a table LS13 which includes a number of rows R corresponding to the number of all of pertaining applications is set may be generated.

Figure 31:
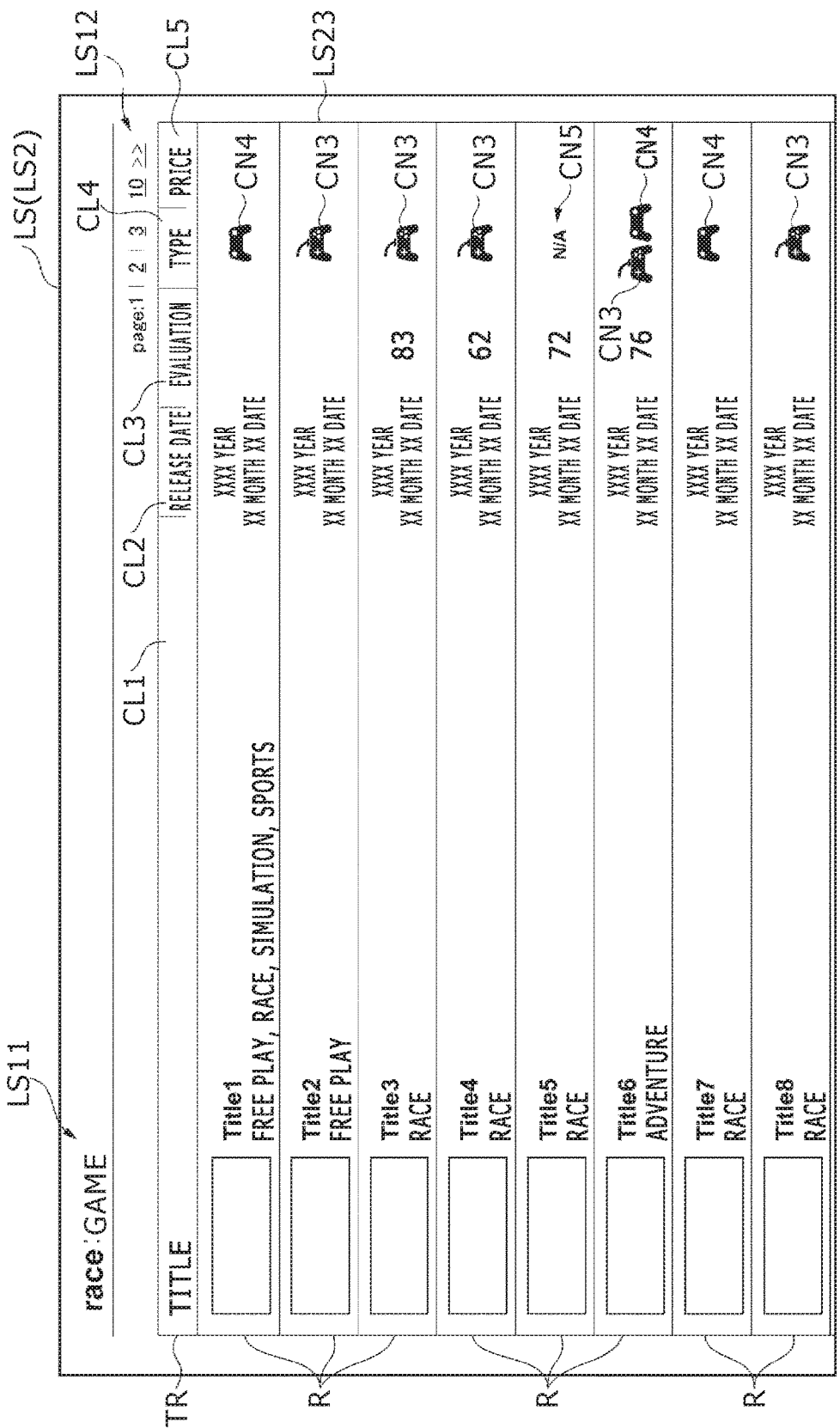
FIG. 31 is a view depicting a different example of the list screen image in the embodiment.

FIG. 31 is a view depicting a list screen image LS2 which is a different example of the list screen image LS.

The transmission information generation unit 444 may generate the list screen image LS2 depicted in FIG. 31 as the list screen image LS.

The list screen image LS2 is a list screen image which distinctly displays applications which can be operated by an operation apparatus connected at present or registered operation apparatus and applications which can be operated by operation apparatus which are not registered (operation apparatus not owned by the user). In the list screen image LS2, a table L23 having a configuration similar to that of the table LS13 is set in addition to the genre displaying region LS11 and the page displaying region LS12.

In the list screen image LS2, the column CL4 denoted as "type" is a column in which types of operation apparatus 2 which can be utilized in applications set in the rows R are indicated by icons similarly as described hereinabove.

For example, an icon CN3 simulating a controller 22 to which a cable is connected indicates that the application can utilize an operation apparatus 2 (controller 22) connected at present to the information processing device 3 or 3A. Meanwhile, an icon CN4 simulating a controller 22 to which a cable is not connected indicates that the application cannot utilize an operation apparatus 2 which is not connected to the information processing device 3 or 3A at present although it is registered that the operation apparatus 2 is owned by the user. Where the icons CN3 and CN4 are applied, the applications can utilize an operation apparatus 2 connected at present and another operation apparatus 2 which is not connected at present but is registered as being owned by the user.

Further, an icon CN5 denoted as "N/A" indicates that the application utilizes an operation apparatus which is not owned by the user. It is to be noted that, in the present embodiment, a link to a homepage of a store from which an operation apparatus to be utilized by the application can be purchased is set, and if the icon CN5 is selected by the cursor CR, then the display contents are changed over to the homepage of the pertaining store.

In particular, the list screen image LS2 is a list screen image on which information of applications which can utilize an operation apparatus 2 (controller 22) connected to the information processing device 3 or 3A at present, information of applications which can utilize operation apparatus 2 which are not connected to the information processing device 3 or 3A at present although they are registered as being owned by the user and information of applications which cannot utilize the operation apparatus mentioned above (namely, applications which utilize operation apparatus which are not owned by the user) can be identified.

Also in such a list screen image LS2 as described above, if an inputting operation is performed for the columns CL1 to CL5 of the title row TR, then filtering or sorting in accordance with contents set to the columns CL1 to CL5 can be performed. This similarly applies also to list screen images LS3 to LS5 described below.

FIG. 32 is a view depicting a list screen image LS3 which is a different example of the list screen image LS.

The transmission information generation unit 444 may generate such a list screen image L3 as depicted in FIG. 32 as the list screen image LS. In the list screen image L3, a table LS33 having a configuration similar to that of the table LS13 described hereinabove is set in addition to the genre displaying region LS11 and the page displaying region LS12.

In the list screen image LS3, the column CL4 denoted as "type" indicates types of operation apparatus 2 which can be utilized by applications set in individual rows and operation contents by the operation apparatus 2 using icons.

For example, in the column CL4, an icon CN6 is set in addition to the icons CN1 and CN2 which indicate that the applications allow utilization of the controller 22 and the mouse 21. The icon CN6 is an icon simulating the controller 22, and a left side portion of the icon CN6 is indicated by a dark tone while a right side portion is indicated by a light tone. Such an icon CN6 as described above is an icon indicating an application which progresses principally in response to an inputting operation for an operation target such as a key, a button or a stick disposed at a left side portion of the controller 22. As the operation target, for example, the direction key 222, buttons 229L and stick 225L of the operation apparatus 2 are available.

From the list screen image L3 in which such an icon CN6 as described above is set, the user not only can recognize, before the user purchases and executes an application, a type of operation apparatus 2 which can be utilized but also can recognize operation contents necessary for the progress of the application.

It is to be noted that, though not depicted, if an application which can progress only with an inputting operation for an operation target disposed at a right side portion of the controller 22 exists, an icon having leftwardly and rightwardly reversed tones from those of the icon CN6 may be used. Further, if an application which can progress without using the right side button of the mouse 21 exists, then an icon indicated by a light tone at a portion thereof corresponding to a right side button in the icon CN2 simulating the mouse 21 may be used. In other words, the pattern of any icon indicative of operation contents can be changed suitably.

FIG. 33 is a view depicting a list screen image LS4 which is another different example of the list screen image LS.

The transmission information generation unit 444 may generate a list screen image LS4 depicted in FIG. 33 as the list screen image LS. In the list screen image LS4, a table LS43 having a configuration similar to that of the table LS13 is set in addition to the genre displaying region LS11 and the page displaying region LS12 described hereinabove.

In the list screen image LS4, the column CL4 denoted as "type" indicates types of operation apparatus 2 which can be utilized by applications set in the rows and operation contents by the operation apparatus 2 using icons and indicates applications corresponding to the adjustment process or operation conversion process and applications which can be progressed even if some operation target is not operated although some function is limited.

For example, in the column CL4, icons CN7 and CN8 are set in addition to the icons CN1, CN2 and CN6.

Out of the icons mentioned, the icon CN7 is an icon simulating a wrench (spanner) and indicates that the application is ready for the adjustment process or the operation conversion process. In other words, an application of the row R in which the icon CN7 is set is an application by which, when the application is executed, operation information converted by the operation correction unit 369 or the operation conversion unit 389 can be accepted.

Meanwhile, the icon CN8 is an icon simulating a downwardly directed arrow mark and is set incidentally to an icon indicative of a type of a utilizable operation apparatus 2 (for example, the icon CN1 indicative of the controller 22). Further, the icon CN8 indicates an application which can be progressed even if some of operation targets provided on the operation apparatus 2 are not operated although part of the functions are limited. For example, where the icon CN8 is set incidentally to the icon CN1, then it indicates an application which can be progressed without using some operation target of the controller 22 (an operation target such as, for example, a button disposed at a left side portion or a right side portion of the controller 22). In particular, the icon CN8 can be utilized, for example, as an icon indicative of an application which can be progressed without operating the controller 22 by one hand.

By such a list screen image LS4 as described above, even if the user does not actually execute an application, the user can recognize the operation contents of an operation apparatus 2 which can be utilized in the application and operation contents for the operation apparatus 2 and besides can recognize whether or not the application is ready for the adjustment process and the operation conversion process or a progressing method of the application using the operation apparatus 2. Accordingly, it is possible for the user to easily select an application in accordance with a liking of the user or an execution environment (in the case of a game application, a play environment, and, for example, an execution environment during commuting).

It is to be noted that, in the list screen image LS4, that the application ready for the adjustment process or the operation conversion process is indicated by the icon CN7. In this context, an icon indicating that the application is an application by which operation conversion settings of a different user (for example, a correction value acquired by the correction value acquisition unit 368 or conversion information acquired by the conversion information acquisition unit 385) can be acquired from a server may be further set to the list screen image LS. In this case, such a configuration may be adopted that, if the icon is selected by the cursor CR or the like, then a screen image indicating the operation conversion settings of the different user is displayed and, if the screen image is operated, then the information processing device 3 or 3A acquires the operation conversion settings of the different user from the server and retain the operation conversion settings for utilization therein.

Further, although the list screen image LS indicates a list screen image in which information about an application of a game or the like is included as contents, the list screen image to be generated by the transmission information generation unit 444 is not limited to this. For example, if requesting information for requesting for the list of contents such as music or a moving picture is received from the information processing device 3 or 3A, then the transmission information generation unit 444 generates transmission information including a list screen of content, and the information transmission unit 445 transmits the transmission information.

[Configuration of Operation Screen Image]

Figure 34:
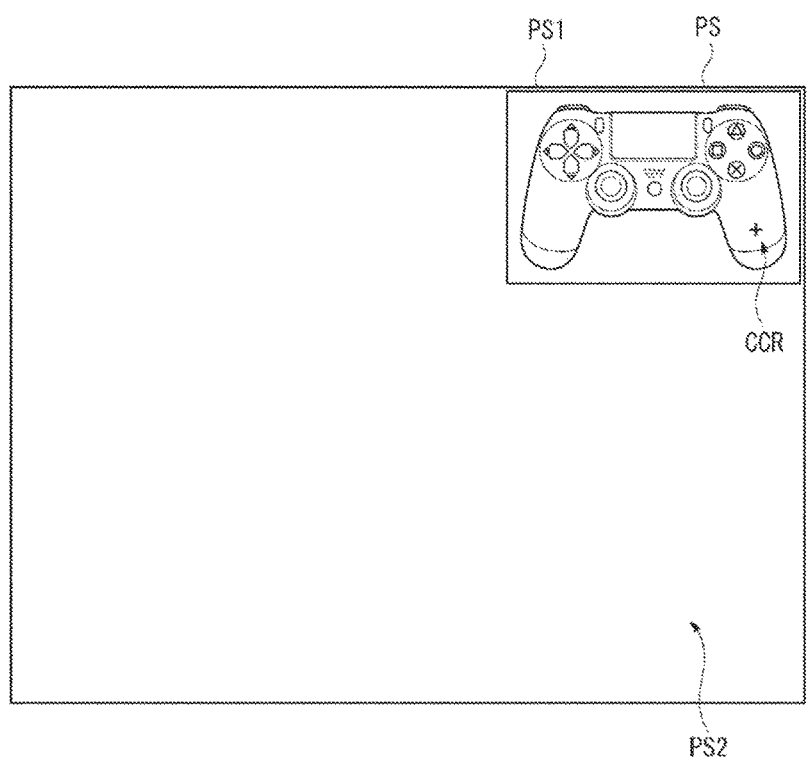
FIG. 34 is a view depicting an example of an operation screen image in the embodiment.

FIG. 34 is a view depicting an example of an operation screen image PS displayed in an overlapping relationship with an execution screen image of the OS and an application when a line-of-sight inputting device which is a different operation apparatus is used.

Incidentally, a line-of-sight inputting device can be connected as a different operation apparatus to the information processing device 3A. This line-of-sight inputting device detects, though not depicted, the direction of a line of sight of a user in the operation screen image PS displayed on the display apparatus DP, detects a predetermined operation such as a wink, and transmits operation information including the detected direction of the line of sight and information representing that the operation is performed.

Besides, if the information processing device 3A detects that the line-of-sight inputting device is connected as an operation apparatus thereto, then the display controlling unit 386 controls the rendering unit 35 to render such an operation screen image PS as depicted in FIG. 34 so as to be displayed. Further, the operation acquisition unit 381 acquires, from the direction of the line of sight included in the acquired operation information, an indication position indicated by the line of sight in the operation screen image PS.

The operation screen image PS is a screen image for causing the information processing device 3A to execute a predetermined process by the line-of-sight inputting device and is displayed in an overlapping relationship with the execution screen image described above. This operation screen image PS includes an operation region PS1 in which a pattern simulating the controller 22 is set while the region of the operation screen image PS other than the operation region PS1 serves as a transmission region PS2 which is an execution screen image displaying region. It is to be noted that the indication position is indicated by a cross-hair cursor CCR in the operation screen image PS.

Thus, if operation information including information that the predetermined operation described above is performed is acquired from the line-of-sight inputting device in a state in which the cross-hair cursor CCR is positioned at the position of an operation target (for example, a button) in the pattern of the controller 22 in the operation region PS1, then the operation conversion unit 389 generates operation information in accordance with the inputting operation for the operation target. Then, the newly generated operation information is outputted to the application execution unit 38B by the operation information outputting unit 390. Consequently, the predetermined processing can be executed by the information processing device 3A in response to the inputting operation using the line-of-sight inputting device in the operation screen image PS.

It is to be noted that the pattern set to the operation region PS1 is not limited to the pattern simulating the controller 22 but may be a pattern simulating the mouse 21. In this case, the operation conversion unit 389 may generate operation information of the mouse 21 in response to an operation for the operation region PS1 using the line-of-sight inputting device. Alternatively, conversion information may be used to generate new operation information similarly as in the case described above.

Further, the operation region PS1 may not be displayed when a predetermined inputting operation is performed. For example, when operation information that a predetermined inputting operation is performed is acquired in a state in which the line of sight of the user is positioned on the outside of the display apparatus DP, the display controlling unit 386 may not display the operation region PS1. In this case, such a configuration that the operation screen image PS is displayed again when a similar operation is performed may be adopted.

In addition, the disposition position of the operation region PS1 may not be a right upper position in the operation screen image PS but may be any position within the operation screen image PS. Further, where the line-of-sight inputting device is used, the display apparatus DP may be an HMD (Head Mounted Display).

FIG. 35 is a view depicting a list screen image LS5 which indicates a list of applications ready for a line-of-sight inputting device from within the list screen image LS generated by the transmission information generation unit 444.

The transmission information generation unit 444 can generate the list screen image LS5 depicted in FIG. 35 as the list screen image LS. The list screen image LS5 is a screen image indicating a list of applications ready for the operation conversion when a line-of-sight inputting device is connected. In the list screen image LS4, a table LS53 having a configuration similar to that of the table LS13 described hereinabove is set in addition to the genre displaying region LS11 and the page displaying region LS12.

In the list screen image LS5, the column CL4 denoted as "type" indicates whether or not applications set in the rows are ready for the operation conversion when a line-of-sight inputting device is connected using icons.

For example, in the column CL4, an icon CN9 is set in addition to the icons CN1 and CN2 indicating that the application is an application which can use the controller 22 and the mouse 21. The icon CN9 is an icon simulating an eye and is set incidentally to the icons CN1 and CN2. For example, if the icon CN9 is set incidentally to the icon CN1, then the icon CN9 indicates that the pertaining application is an application which can convert an inputting operation by a line of sight into an inputting operation of the controller. In particular, if the line-of-sight inputting device is connected to the information processing device 3A, then the operation screen image PS in which a pattern simulating the controller 22 is set in the operation region PS1 is displayed upon execution of the application. Similarly, if the icon CN9 is set incidentally to the icon CN2, then it indicates that the pertaining application is an application which can convert an inputting operation by a line of sight into an inputting operation of the mouse 21.

The information processing device 3A acquires transmission information including such a list screen image L55 as described above from the server 4B and causes the display apparatus DP to display the list screen image L55. By this, before the application is purchased and executed, the user can easily decide an application ready for a line-of-sight inputting device.

Effects of Third Embodiment

With the information processing system 1B according to the present embodiment described above, the following effects can be anticipated in addition to similar effects to those of the information processing systems 1 and 1A described hereinabove.

In the list screen image LS2 displayed by the information processing device 3 or 3A which receives transmission information from the server 4B, information of applications which can utilize an operation apparatus 2 connected to the information processing device 3 or 3A, information of applications which can utilize operation apparatus 2 registered in advance in the information processing device 3 or 3A, information of applications which cannot utilize operation apparatus 2 owned by the user are displayed distinctly. With the list screen image LS2, the applications which can utilize the operation apparatus 2 owned by the user can be identified readily. Accordingly, it is facilitated to recognize utilizable applications.

In the list screen image LS2, by operating an operation apparatus 2 from the displayed context menu MN to select the selection item MN1 or MN2, information of applications which can utilize the "controller in connection" or the "registered controllers" can be filtered from within the information of the applications set in the list screen image LS2. Also it is possible to sort the information of the applications similarly as described hereinabove. Accordingly, the applications which can be operated by the operation apparatus 2 owned by the user can be identified readily.

Modifications to Embodiments

The present invention is not limited to the embodiments described above, but modifications, improvements and so forth within the range within which the objects of the present invention can be achieved are included in the present invention.

In the embodiments described above, the correction value calculation unit 365 calculates, when the mouse 21 is connected, a correction value on the basis of an input amount which is an integration value of acquired input values and a reference amount set in advance. However, the present invention is not limited to this. For example, similarly as upon operation of a stick 225, a rotation amount which is an integration value of a rotation angle in accordance with an input value acquired when the user operates the mouse 21 to move in order to cause the point of view to go round may be used as an input value such that a correction value is calculated on the basis of the input amount and 360 degrees of the reference amount. In this case, the operation correction unit 369 may be configured such that the operation correction unit 369 uses the correction value to correct the rotation angle in accordance with the input value to be acquired. Further, one of the keys and the buttons provided on the operation apparatus 2 may be replaced with a different key or a different button such that, if an operation signal in accordance with the key or the button is inputted, then a process in accordance with an input of a corresponding different key or different button is executed.

In the embodiments described above, as the predetermined process, a process which is processed when an application such as an FPS game is executed and which rotates the line of sight in a virtual space of the game is described. However, the present invention is not limited to this. For example, when a process of moving an object such as a character is moved in accordance with a depression time period of a button, the amount of movement of the character in accordance with the depression time period may be adjusted. In other words, the process of the adjustment target can be changed suitably. Further, the present invention is not limited to a configuration wherein the processing amount is corrected in response to an input value acquired in accordance with a moving operation of the mouse 21 and a tilting operation of a stick 225 but may use a configuration wherein the processing amount is corrected in accordance with an operation signal (input value) acquired in accordance with a direction key disposed on the controller 22 or an inputting operation of a button disposed on the controller 22 or the mouse 21.

In the embodiments described above, the direction in which the field of view in a virtual space of a game is rotated is assumed to be a leftward or rightward direction of rotation in the virtual space, the direction of rotation may be an upward or downward direction.

Further, while, in the embodiments described above, the reference amount is an input amount when the point of view in the virtual space goes round, the present invention is not limited to this. The rotation angle of the point of view rotated by an input of the reference amount may be a half circumference and can be changed suitably. In this case, the player may be urged on the adjustment screen image to carry out an inputting operation for rotating the point of view of the player by the angle.

Further, thereupon, the player may be urged to carry out an inputting operation for rotating the point of view of the player by different angles such that correction values in accordance with the angles are calculated. For example, the player may be urged to carry out an inputting operation for rotating the point of view by a first angle (for example, 90 degrees) and another inputting operation for rotating the point of view by a second angle (for example, 180 degrees) such that correction values in accordance with the angles are calculated. In this case, the correction value calculation unit 365 may be configured such that the correction value calculation unit 365 calculates and generates a curve of the correction value (correction curve) from a correction value calculated on the basis of an input amount for rotating the point of view by the first angle and a correction value calculated on the basis of an input value for rotating the point of view by a second angle, and the operation correction unit 369 corrects an input value on the basis of the curve. In particular, the correction value calculation unit 365 may be configured such that the correction value calculation unit 365 causes the player to carry out inputting operations for rotating the point of view by angles different from each other and calculates a correction curve from a plurality of correction values calculated on the basis of input amounts acquired then and reference amounts in accordance with the angles and then the correction value calculation unit 365 uses the correction curve to correct an input value.

In the embodiments described above, an image of an example of a play screen image of a game being executed by the application execution unit 36B is set in the image setting region AP1 of the adjustment screen image AP. However, the present invention is not limited to this. For example, where the OS execution unit 36A has the adjustment screen image displaying unit 363, the image (including a moving picture) set in the image setting region AP1 may be an image having no relationship with the game being executed. In this case, a moving picture wherein the point of view goes round as described above may be set and displayed in the image setting region AP1.

Further, an adjustment screen image (for example, the adjustment screen image AP) may be displayed during execution of an application by the application execution unit 36B, and a correction value calculation process including acquisition of the input amount may be executed. Thereupon, if the OS execution unit 36A has the adjustment screen image displaying unit 363, then if a configuration which does not pass an input value when the adjustment screen image is displayed to the application execution unit 36B is adopted, then a game being executed can be suppressed from being progressed.

Further, if the information processing device 3 executes the correction value calculation process described above when the information processing device 3 temporarily interrupts the progress of a game based on an application being executed in response to an inputting operation of the user, then the following configuration may be adopted.

For example, the application execution unit 36B stores the direction of the point of view upon interruption and establishes a state in which only a rotation operation of the point of view is permitted (state in which time in the game does not flow). Then, the player is caused to execute an inputting operation for rotating the point of view by a predetermined angle, and the correction value calculation unit 365 calculates the correction value on the basis of the input value acquired then and the reference value described above. Thereupon, the point of view is rotated in accordance with the inputting operation, and a screen image in accordance with the point of view after the rotation is rendered and displayed. Then, if the correction value correction process comes to an end and the temporary interruption of the game is cancelled by the player, then the point of view returns to the point of view before the interruption and a screen image in accordance with the point of view is rendered and displayed. Further, an input value acquired later is corrected by the operation correction process described above, and the point of view in the game is operated thereby.

By the configuration described above, also while the game is progressing, the operation correction state can be set and changed readily.

In the embodiments described above, in the information processing device 3, when a correction value is acquired by the correction value acquisition unit 368, correction of an input value, or correction of a rotation angle of the point of view in accordance with an input value, is executed by the operation correction unit 369. However, the present invention is not limited to this. For example, the information processing device 3 may be configured such that the operation correction process is executed only when a particular application (for example, a game application) is executed.

While, in the embodiments described hereinabove, the operation apparatus 2 and the display apparatus DP are configured as separate apparatus, the present invention is not limited to this. The operation apparatus and the display apparatus may be configured integrally, for example, like an HMD. Where the operation apparatus and the display apparatus are configured as an integrated HMD, for example, a detection result by a sensor which detects a movement of the head of the user may be acquired as an input value. Further, if a processing result by the information processing device 3 or 3A can be confirmed, then the display apparatus DP is not necessarily required essentially.

In the embodiments described above, the operation apparatus 2 is configured by including a mouse 21 and a controller 22 having a stick 22S. However, the present invention is not limited to this. In particular, the operation apparatus 2 may be configured such that, when one of the mouse 21 and the controller 22 is connected thereto, the adjustment process is executed. Further, the operation apparatus 2 connected to the information processing device 3 or 3A is not limited to the mouse 21 and the controller 22, but other operation apparatus such as a pointing device of a different type may be connected.

In the embodiments described above, the correction value acquisition unit 368 acquires, when a pertaining correction value is not retained in the storage 33, the correction value from the server 4 or 4B. However, the present invention is not limited to this. In particular, the correction value acquisition unit 368 may not have the function for acquiring a correction value from the server 4 or 4B, and if it is communicable with the server 4 or 4B and a correction value is retained in the server 4 or 4B, then the correction value may not be retained in the storage 33. In this case, a function unit related to the correction value calculation process may not be provided. In the embodiments described above, the operation correction unit 369 does not execute the operation correction process when a correction value is not acquired successfully. The operation correction unit 369 may be configured such that the player (user) can select whether or not such an operation correction process is to be executed.

In the embodiments described above, the conversion screen image CS1 includes the pre-conversion operation display region CS11, and the operation displaying region CS21 of the conversion screen image CS2 indicates a pre-conversion operation. However, the present invention is not limited to this. For example, the pre-conversion operation display region CS11 may not be set, and the operation displaying region CS21 may not indicate a pre-conversion operation. In short, a pre-conversion operation may not be displayed in a screen image.

In the embodiments described above, the pre-conversion operation registration screen image RS1, the post-conversion operation registration screen image RS2, conversion screen images CS1 and CS2 and operation screen image PS are displayed in an overlapping relationship with an execution screen image of the OS and an application. However, the present invention is not limited to this. In particular, in each screen image, an execution screen image displaying region in which an entire execution screen image is displayed may be set individually. For example, the conversion screen image CS may be a screen image in which an execution screen image displaying region in which an entire execution screen image is displayed is set in a region other than the pre-conversion operation display region CS11 and the post-conversion operation display region CS12.

In the embodiments described above, the pre-conversion operation display region CS11 and the post-conversion operation display region CS12 in the conversion screen image CS1 are always displayed, and the operation displaying region CS21 in the conversion screen image CS2 is always displayed. However, the present invention is not limited to this. In particular, when operation information in accordance with an inputting operation which is not converted by the operation conversion unit 389 is acquired by the operation conversion unit 389, then the display regions CS1, CS12 and CS21 may not be displayed.

In the embodiments described above, conversion information is generated by the conversion information generation unit 387 and transmitted to and registered into the server 4A or 4B by the conversion information transmission unit 388. However, the present invention is not limited to this. In particular, even if conversion information is not generated and retained in advance in accordance with an inputting operation of the user, the conversion information may be provided as an updating program of the OS or an application from the server 4A or 4B.

In the embodiments described above, conversion information can be obtained from the server 4A or 4B. However, conversion information may be acquired from an external apparatus such as an external storage connected to the information processing device 3A. As such an external apparatus as just mentioned, an external storage apparatus such as an HDD or a flash memory can be exemplified. Further, conversion information may not be retained in the storage 33, and if the information processing device 3A is normally communicable with an external apparatus such as the server 4A or 4B, then the conversion information may be retained in the external apparatus.

In the embodiments described above, as an example of operation information converted by an operation conversion process, operation information in accordance with an input of the button 229L and a tilting operation of the stick 225L which are converted into operation information in accordance with a tilting operation of the stick 225R and operation information in accordance with a tilting operation of the stick 225L in an upward direction which is converted into operation information in accordance with a tilting operation of the stick 225L in a downward direction are indicated. However, the present invention is not limited to this. In particular, the operation contents given as examples in the embodiments described above are exemplified so as to facilitate understanding of the present invention, and the present invention is not restricted by the operation contents. In other words, the pre-conversion operation and the post-conversion operation are not limited to the operation contents but may be different operation contents.

For example, the sensitivity adjustment of a stick 225 or the touch pad 224 may be included in the operation conversion process based on conversion information as described hereinabove. In this case, an operation for tilting the operation element 2251 to the utmost in a predetermined direction is determined as the pre-conversion operation, and operation information in accordance with the pre-conversion operation is converted into operation information in accordance with an operation for tilting the operation element 2251 by a tilting amount of approximately one half in the same direction (post-conversion operation) to adjust the sensitivity of the stick 225. Further, operation information may be converted such that, for example, in an application in which a predetermined function is switched every time a certain button is inputted, when the button continues to be inputted, the state in which changeover to the predetermined function is performed is maintained.

In the embodiments described above, when operation information in accordance with an inputting operation same as a pre-conversion operation included in conversion information is acquired, the operation conversion unit 389 executes an operation conversion process for converting the operation information into operation information in accordance with a post-conversion operation corresponding to the pre-conversion operation. However, the present invention is not limited to this. In particular, the operation conversion unit 389 may be configured such that the user can select whether or not an operation conversion process is to be executed as described hereinabove.

The layout of the screen images and the design of the markers, icons and so forth indicated in the embodiments described hereinabove can be changed suitably.

In the embodiments described above, the program for executing the adjustment process, conversion information generation process and operation conversion process is retained in the storage 33. However, the present invention is not limited to this. For example, when the processes are to be performed, they may be acquired from a sever or the like through the network N or may be recorded in a different form.

INDUSTRIAL APPLICABILITY

The present invention can be applied suitably to an information processing device connected to an operation apparatus.

Further, the present invention can be utilized suitably in an information processing device such as, for example, a game apparatus or a PC.

REFERENCE SIGNS LIST 1, 1B . . . Information processing system, 2 . . . Operation apparatus, 3 . . . Information processing device, 3A . . . Information processing device, 32 . . . Communication unit, 36B . . . Application execution unit (processing unit), 361 . . . Operation acquisition unit, 365 . . . Correction value calculation unit, 368 . . . Correction value acquisition unit, 369 . . . Operation correction unit, 370 . . . Processing unit, 38A . . . OS execution unit (main control unit), 38B . . . Application execution unit (execution unit), 381 . . . Operation acquisition unit, 386 . . . Display controlling unit, 387 . . . Conversion information generation unit, 389 . . . Operation conversion unit, 391 . . . Execution unit, 4, 4B . . . Server (external apparatus), DP . . . Display apparatus, CS1, CS2 . . . Conversion screen image (screen image), CS11 . . . Pre-conversion operation displaying region, CS12 . . . Post-conversion operation displaying region, CS13, CS22 . . . Transmission region (execution screen image displaying region), CS21 . . . Operation displaying region (pre-conversion operation displaying region, post-conversion operation displaying region), RS1 . . . Pre-conversion operation registration screen image, RS2 . . . Post-conversion operation registration screen image

The invention claimed is:

1. An information processing device, comprising:
an operation acquisition unit configured to acquire an input value in accordance with an inputting operation from an operation apparatus;
a correction value calculation unit configured to calculate a correction value on a basis of an input amount which is an integrated value of the input value acquired by the operation acquisition unit when the inputting operation for rotating a point of view of rendering in a virtual space by a given angle is performed and a reference amount set in advance as an input amount for rotating the point of view by the given angle;
an operation correction unit configured to correct a rotation angle corresponding to the acquired input value on a basis of a correction value retained in advance; and
a processing unit configured to rotate a point of view of rendering in a virtual space in accordance with the corrected rotation angle,
wherein the operation apparatus detects an acceleration value upon an inputting operation,
the operation acquisition unit acquires the acceleration value as the input value, and
the correction value calculation unit acquires an integration value of a speed based on the acceleration value acquired within a time period of an inputting operation within which the point of view is rotated by the given angle as the input amount when the inputting operation for rotating the point of view by the given angle is performed.

2. The information processing device according to claim 1, further comprising:
a correction value acquisition unit configured to acquire the correction value from an external apparatus,
wherein the operation correction unit uses the correction value acquired by the correction value acquisition unit.

3. An information processing system, comprising:
an information processing device, including an operation acquisition unit configured to acquire an input value in accordance with an inputting operation from an operation apparatus,
a correction value calculation unit configured to calculate a correction value on a basis of an input amount which is an integrated value of the input value acquired by the operation acquisition unit when the inputting operation for rotating a point of view of rendering in a virtual space by a given angle is performed and a reference amount set in advance as an input amount for rotating the point of view by the given angle,
an operation correction unit configured to correct a rotation angle corresponding to the acquired input value on a basis of a correction value retained in advance;
a processing unit configured to rotate a point of view of rendering in a virtual space in accordance with the corrected rotation angle; and
an operation apparatus configured to transmit an input value in accordance with an inputting operation to the information processing device,
wherein the operation apparatus has an operation element provide for tilting motion and detects a coordinate value indicating a position of the operation element after the tilting motion,
the operation acquisition unit acquires the coordinate value detected by the operation apparatus as the input value,
the correction value calculation unit determines, as the input value when an inputting operation for rotating the point of view by the given angle is performed, an integration value of a rotation angle corresponding to the coordinate value within a time period within which the coordinate value indicating a position of the operation element after the tilting motion is acquired and calculates the correction value on a basis of the input amount and the reference amount, and
the operation correction unit corrects a rotation angle in accordance with the coordinate value acquired from the operation apparatus on a basis of the correction value.

4. A correction method which is performed using an information processing device which executes a rendering process of a virtual space and corrects a rotation angle of a point of view in accordance with an inputting operation for an operation apparatus, the method comprising:
acquiring an input value in accordance with an inputting operation from the operation apparatus;
calculating a correction value on a basis of an input amount which is an integrated value of the input value acquired when the inputting operation for rotating the point of view by a given angle is performed and a reference amount set in advance as an input amount for rotating the point of view by the given angle;
correcting a rotation angle corresponding to the acquired input value on a basis of a correction value retained in advance; and
rotating the point of view in response to the corrected rotation angle,
wherein the operation apparatus detects an acceleration value upon an inputting operation,
wherein the acceleration value is acquired as the input value, and
wherein an integration value of a speed, is acquired, based on the acceleration value acquired within a time period of an inputting operation within which the point of view is rotated by the given angle as the input amount when the inputting operation for rotating the point of view by the given angle is performed.

5. A non-transitory computer readable medium having stored thereon a correction program executed by an information processing device which executes a rendering process of a virtual space for correcting a rotation angle of a point of view in accordance with an inputting operation for an operation apparatus, the correction program for the information processing device, comprising:
   by an operation acquisition unit, acquiring an input value in accordance with an inputting operation from the operation apparatus;
   by a correction value calculating unit, calculating a correction value on a basis of an input amount which is an integrated value of the input value acquired when the inputting operation for rotating the point of view by a given angle is performed and a reference amount set in advance as an input amount for rotating the point of view by the given angle;
   by an operation correction unit, correcting a rotation angle in accordance with the acquired input value on a basis of a correction value retained in advance; and
   by a processing unit, rotating the point of view in accordance with the corrected rotation angle,
   wherein the operation apparatus has an operation element provided for tilting motion and detects a coordinate value indicating a position of the operation element after the tilting motion,
   wherein the operation apparatus has an operation element provided for tilting motion and detects a coordinate value indicating a position of the operation element after the tilting motion,
   the operation acquisition unit acquires the coordinate value detected by the operation apparatus as the input value,
   the correction value calculation unit determines, as the input value when an inputting operation for rotating the point of view by the given angle is performed, an integration value of a rotation angle corresponding to the coordinate value within a time period within which the coordinate value indicating a position of the operation element after the tilting motion is acquired and calculates the correction value on a basis of the input amount and the reference amount, and
   the operation correction unit corrects a rotation angle in accordance with the coordinate value acquired from the operation apparatus on a basis of the correction value.

* * * * *